United States Patent [19]

Pulverenti et al.

[11] Patent Number: 4,532,509
[45] Date of Patent: Jul. 30, 1985

[54] COMMUNICATION SYSTEM HAVING TIMER CONTROLLED FIELD STATIONS

[75] Inventors: John T. Pulverenti, Gates; Robert S. Hentz, Fairport; John J. DiPaola, Penfield, all of N.Y.

[73] Assignee: General Signal Corporation, Stamford, Conn.

[21] Appl. No.: 524,901

[22] Filed: Nov. 18, 1974

[51] Int. Cl.³ .............................................. H04Q 9/00
[52] U.S. Cl. .................................. 340/825; 340/825.15
[58] Field of Search ............. 340/163, 147 R, 147 LP, 340/167 B, 152 R, 151; 79/5 R

[56] References Cited

U.S. PATENT DOCUMENTS 3,810,103  5/1974  Ricci ............................... 340/163 X Primary Examiner—Harold I. Pitts
Attorney, Agent, or Firm—Pollock, Vande Sande & Priddy

[57] ABSTRACT

A communication system for communicating between the master station and one or more groups of field stations wherein each group of field stations are interconnected with the master station by a full duplex communication link. Information originates at the master station and may be transmitted to a designated field station. The field station also originates data which is transmitted to the master station on request. The master station includes a digital computer to manage the system. Each remote station may have an individualized communication cycle period which dictates the maximum and minimum times between communication. The master station apparatus schedules communications, monitors communication attempts, controls retrys and logs the number of failures as well as the type of communication failure. The digital computer, running under program control directly controls an office modem controller which communicates, through a modem, with a selected field station modem, over the communication link. The program gives the system a wide degree of flexibility in adding field stations or group of field stations, and in varying the individual communication cycle for each station without modifying the program. Furthermore, the message transmitted to each of the field stations is individualized with respect to the configuration of the field station, and the message transmitted from the field station to the master station is likewise individualized depending on the configuration of the field station.

12 Claims, 35 Drawing Figures

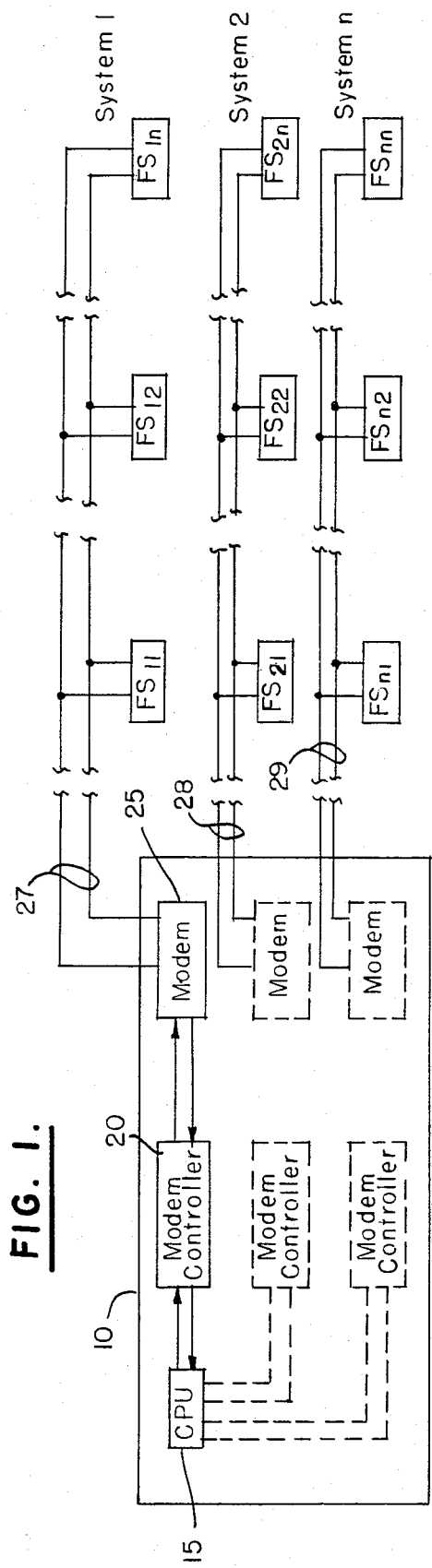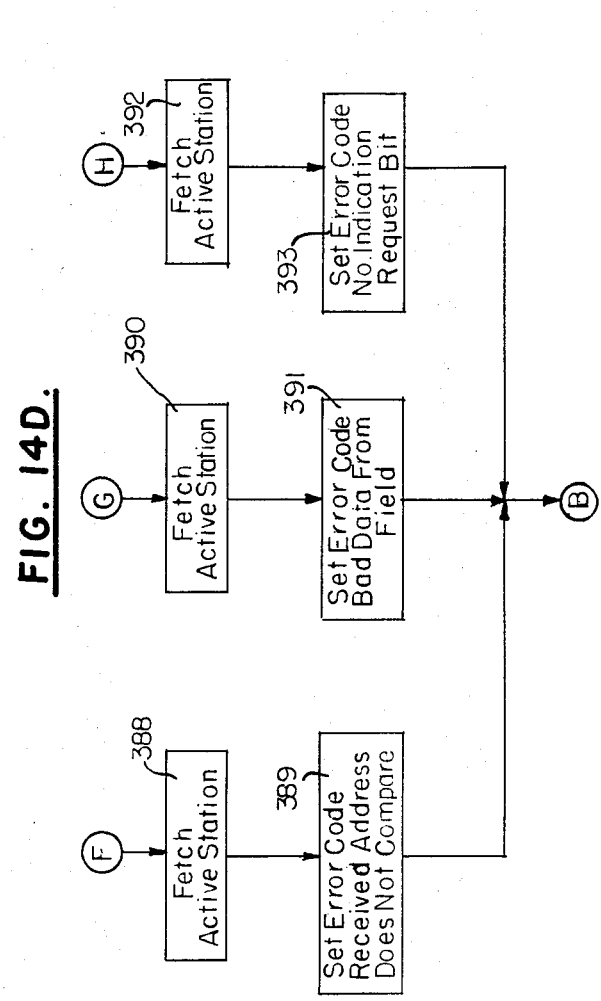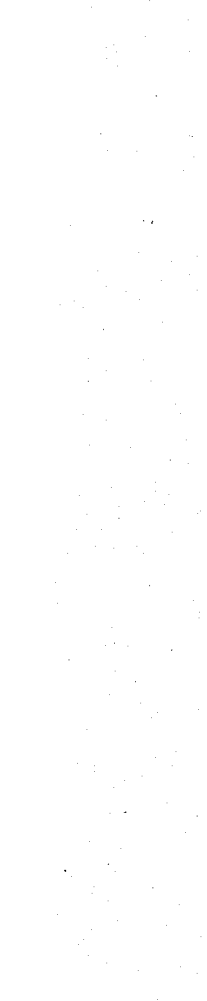
FIG. 1.
FIG. 2C.
FIG. 14D.

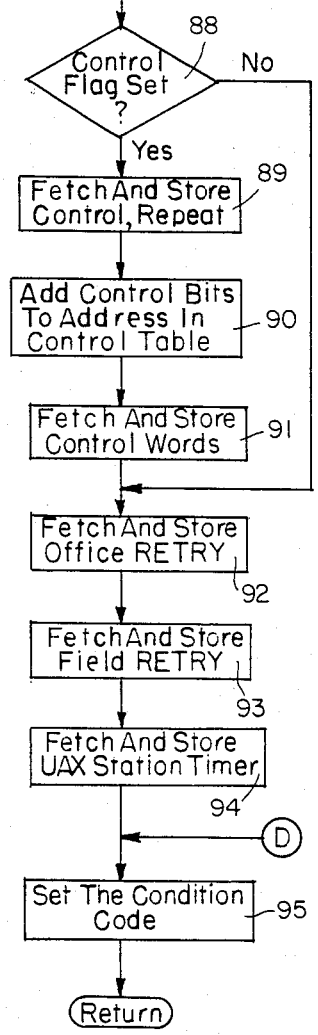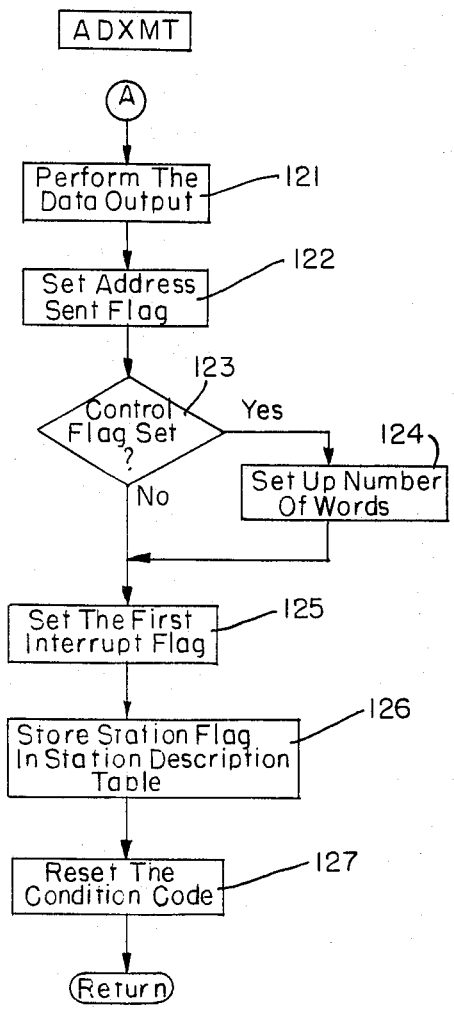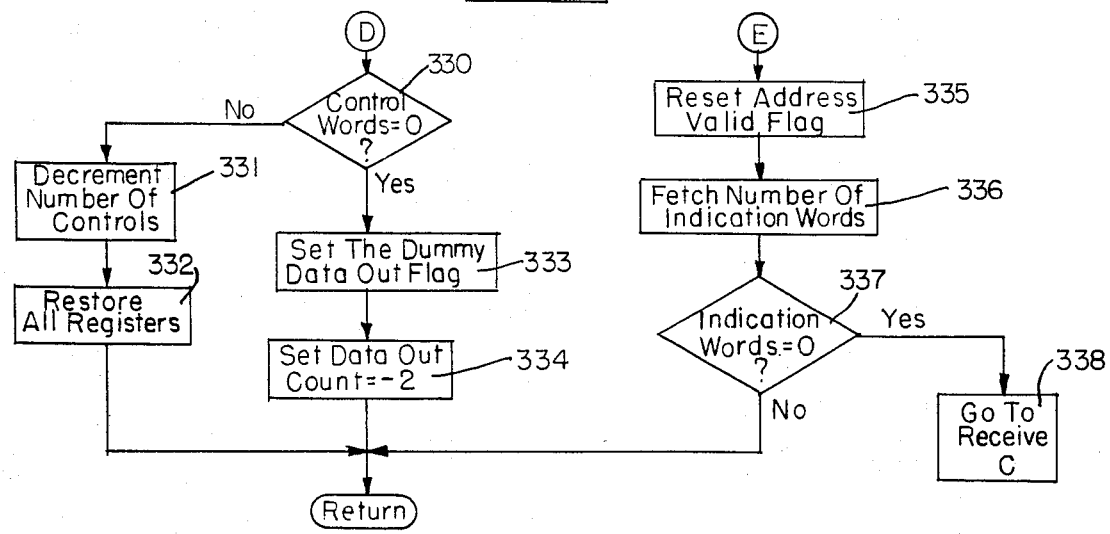

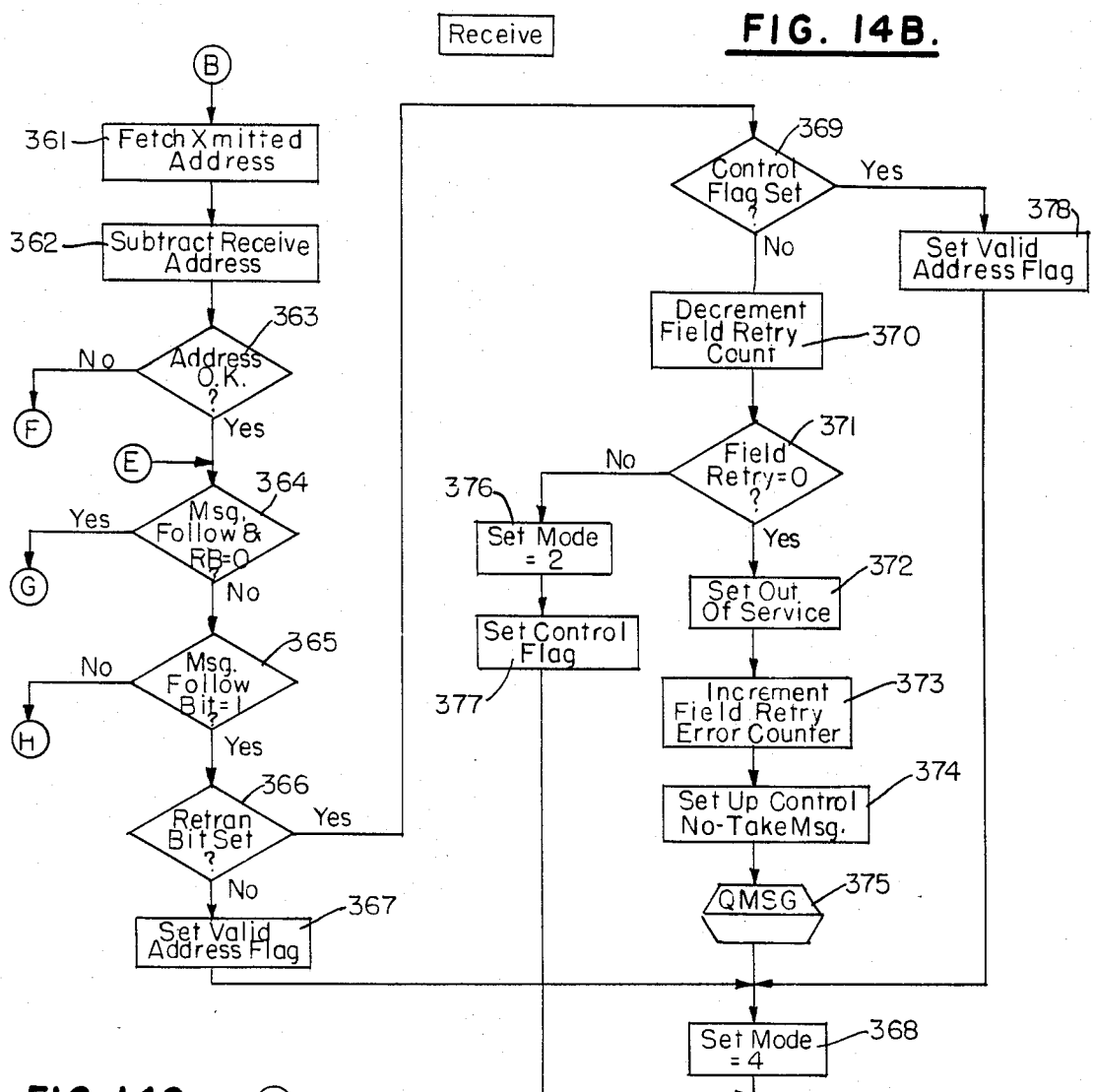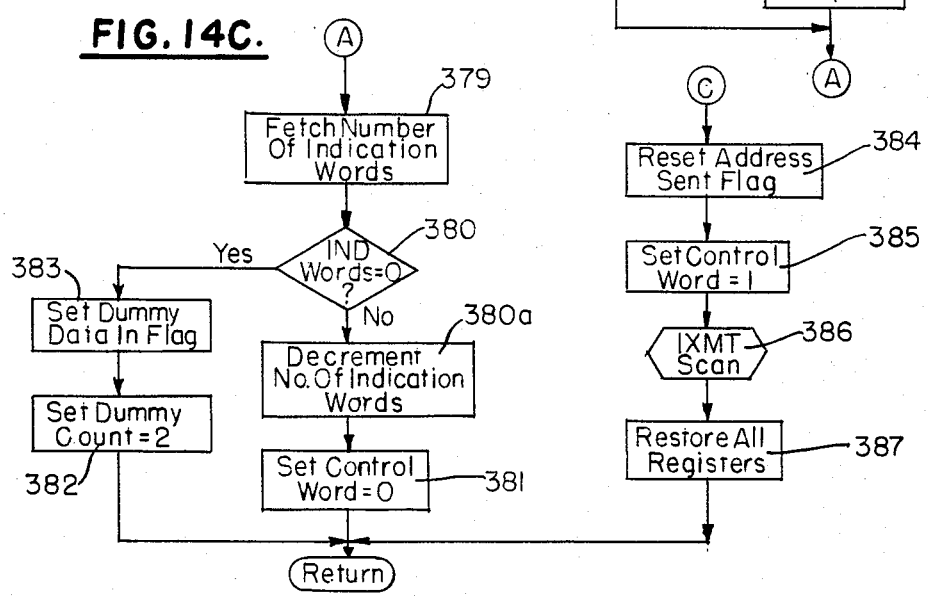

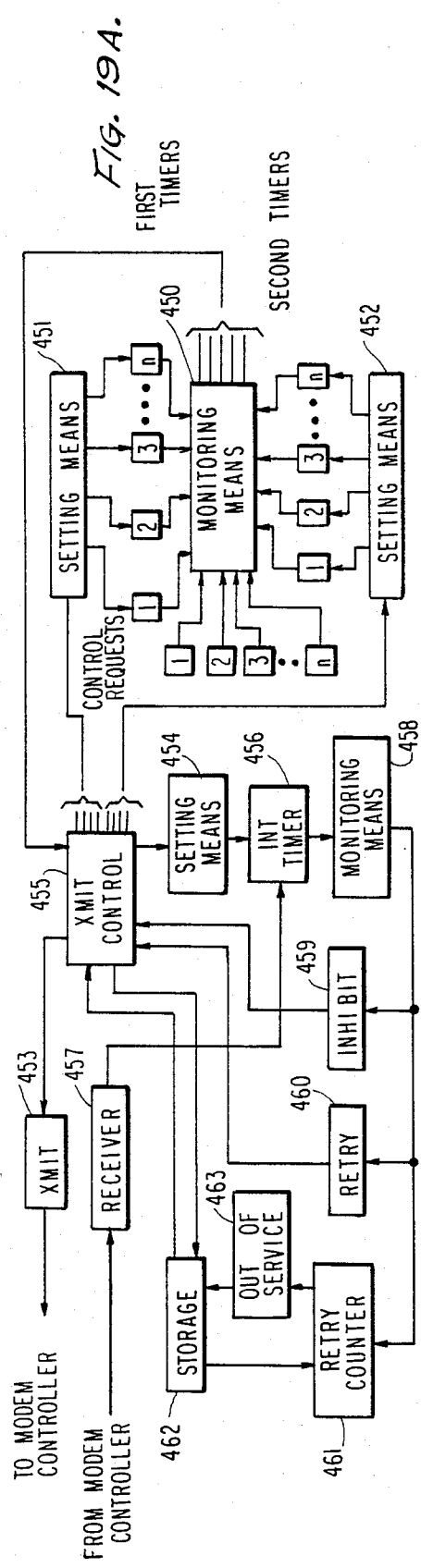
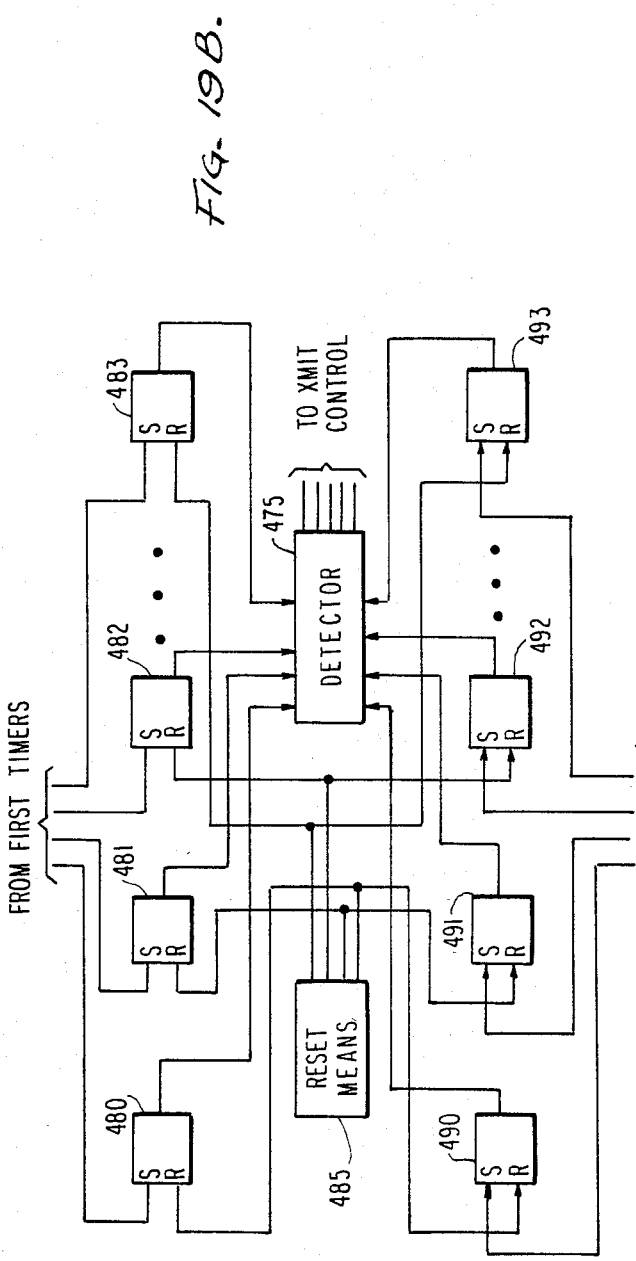
FIG. 19A.
FIG. 19B.

COMMUNICATION SYSTEM HAVING TIMER CONTROLLED FIELD STATIONS

FIELD OF THE INVENTION

The present invention relates to a communication system and more particularly to a communication system in which a master station communicates, over a full duplex communication link, with one or more groups of field stations. Data is originated at both the master station and the field stations, and a digital computer, controlling the system, manages the transmission of the master station for efficient and flexible operation.

BACKGROUND OF THE INVENTION

The present invention relates to a communication system in which a master station communicates with a group, or a plurality of groups, of remote field stations over one or more full duplex communication links. This apparatus finds particular application in the railroad industry in implementing a centralized traffic control system. Another application of this type of communication system if found in the electric power industry wherein a master station communicates with and controls a plurality of remote field stations.

Taking the railroad application as an example, it was found, many years ago, that increases in efficiency could be obtained by centralizing the control of track switches and track signals in a railroad territory, which may extend for hundreds of miles. Of course, the operator of the centralized traffic system must have continuous up to date information respecting the position of trains in the territory, as well as the condition of track switches and track signals. This is one of the functions traditionally accomplished by the communication system. Additionally, in order to make effective the operator initiated controls, the communication system must transmit the controls from the central office to the appropriate field station in order to actuate the equipment to be controlled.

In the parlance of this field, the data transmitted from the central office, or master station, to an appropriate field station, are termed controls. For purposes of efficient transmission and error checking, the message may be broken up into a number of words, each of which includes an equal number of bits. The first word would normally include the address of a particular field station to which the control is directed. The field stations include receivers which respond to the address of the field station when transmitted to and allow the remaining portion of the message to be received and acted on. The equipment which any field station controls depends, of course, on the configuration of the railroad at that location, including the number of track switches and track signals and the track configuration. The control message must, then be individually configured for each field station and therefor the number of words in a control message may be different for different ones of the field station.

In order to provide the operator at the master station with a picture of the condition of the territory he is to control, information must be transmitted, from each of the field stations, to the master station indicative of the conditions at that location. This data is termed indications and may include the position of railway track switches, the occupancy condition of track sections and the condition of track signals. Generally the indication transmission, that is the transmission from the field station to the master station is initiated by the reception, at the field station, of a message from the master station. This indication message also includes a plurality of words, the first of which may comprise an address, so that the master station is informed of the identity of the field station from which data is being received. The indication message may also include a number of indication words and, of course, the number of indication words depends, in large part, on the railroad apparatus at the field location.

Communication systems for this type of application have a number of requirements in common with many other types of communication systems. One requirement is that indications be transmitted, from each of the field stations, to the master station, at a rate sufficient to give the operator at the master station a "picture" of the railroad condition that is accurate enough for him to act on. In addition, of course, controls must be transmitted at a rate sufficient to ensure that the transmitted control will be received and acted on at the appropriate time. A second requirement is that transmission errors be minimized. Obviously, if an error occurs in an indication message, the operator may be misled as to the condition of the equipment in the field. Similarly, if a transmission error occurs in a control message, apparatus in the field may not be properly operated. Although it is common practice in the railroad industry to equip the field apparatus with safety circuits such that unsafe operations cannot occur, an erroneous control will still require corrective action, needlessly tie up equipment and correspondingly reduce the efficiency of the railroad. In summary, the two requirements of the system are that communications, in both directions, be sufficiently rapid to meet system requirements and, at the same time, be substantially error free.

The prior art illustrates communication systems which have been used in a centralized traffic control system environment which are characterized by extensive use of relays. As compared with present day desires these systems exhibit a need for improvement in two areas. One area is related to speed. The relays are limited in speed of operation by inherent mechanical limitations. The second area in which these systems appear to be in the need of improvement lies in the area of flexibility. It should be apparent, from the above brief recitation of the functions to be performed by the communication system that these systems are complex. This makes the operations of design, manufacture and installation, tedious, time consuming and, therefore expensive. By its very nature the relay system did not allow slight changes in function to be effected by simple changes in equipment. Thus, changes in the field may necessitate the addition or deletion of field stations, changing the number of words in a control or indication message, or the like.

Since each of the field stations is, in effect, a unique communication receiver and transmitter, it may be desirable, and sometimes is necessary, to tailor different communication cycle for different ones of the field stations. By communication cycle is meant the delay period between a first transmission to a particular field station and the second transmission to the same field station. Thus, conditions at one field station may require communications to take place within the period of time t, whereas conditions at a second field station may justify the necessity for communications only within a longer period $t_2$ (that is $t < t_2$ or even, $t < < _2$). Obviously, it may be possible to arrange the communication system to communicate with each station within the shorter period t. Clearly, however, it would be more desirable to arrange the communication system such that the first station's communication cycle is less than or equal to t, while the second station's communication cycle is less than equal to $t_z$. In this manner unnecessary communications with the second field station are not built into the communication system.

The prior art teaches a number of checking procedures that can be employed by the communication system to verify the reliability of the received data, either indications or controls. Furthermore, it is well known in the art to arrange a communication system such that, if unreliable data is detected, retransmission of that data is requested.

For instance, if a field station determines that transmitted controls are, for some reason, considered unreliable, its indication transmission will contain an indication of the status of the received controls and a request that the controls be retransmitted. During the operation of the communication system, however, a station may be out-of-service for one of a number of reasons. It may be the subject of periodic maintenance, or it may be out-of-service due to an equipment failure. For any of these, or other reasons, the out-of-service station will appear to the master station as if a failure in communications had occurred. The master station may then initiate a number of retries, in an attempt to establish communications with that station. Of course, since the station is out-of-service, the master station will not be successful. However, the time wasted in this attempt can be saved if the master station has means, at its disposal, to detect whether or not a station is out-of-service.

Regardless of the apparatus employed to perform the functions necessary to manage a communication system, it is apparent that modifications to the system can be time consuming due to the complex nature of the system. Furthermore, in some situations it is apparent when a system is installed that the number of active field stations are less than the total number of contemplated field stations. It would be desirable, to arrange the communication system to be capable of operating with the contemplated number of stations. At the same time, however, there is the desire not to bog down the communication system in attempts to communicate with non-existent or non-operative field stations.

Furthermore, communication systems intended to satisfy the applications referred to above usually operate in a sequence wherein the master station addresses a control message to a particular field station which, on receipt of its address will initiate the transmission of indications to the control office. Since the communication link is duplex, controls may be transmitted simultaneous with the transmission of indications. Since it may be necessary to retransmit the control message and furthermore since the system has no way of knowing whether or not a retransmission is necessary until the indications have been received, these communication systems generally monitor the received indications to determine whether or not a retransmission of the control message is desired. However, field station transmission failures may result in the master station hanging up or waiting for an indication transmission that will not occur. This obviously needlessly ties up the communication links and therefore is desirable to provide apparatus to determine that it is no longer useful to monitor the field station link and the control system should move on to other pending communication needs.

SUMMARY OF THE INVENTION

The present invention provides a communication system with high speed characteristics and large degrees of flexibility. The present invention employs a digital computer which is operated under program control to achieve the desirable goal set out above with flexibility in its operation that is unparalled in the prior art.

In order to individually tailor the communication system to the needs of each field station, both as to control message size, expected indication size and communication cycle, the characteristics of each field station are separately stored internal to the computer. This storage also includes data definitive of the service status of the field station, that is whether or not it is out-of-service or whether it corresponds to a station which is contemplated but not yet in service. With this information, the system can determine whether or not communication should be initiated with the field station. At the same time, however, merely varying the internal storage status of the field station enables the field station to come "on-line" with no modification to the program control. Furthermore, the control system can, in response to conditions at a field station determine that that field station is out-of-service and automatically take it out of the normal communication cycle. In this event an out-of-service timer is set and started. This period may be much longer than the normal service period for operative stations, for instance normal servicing period for a station may be one second whereas the out-of-service station may not be tried for thirty minutes.

In order to tailor the communication period individually for each field station a first plurality of timers are provided, one for each field station. A timer is set to a value which is related to the desired length of the communication period each time communications are had with that station. When the timer times out, indicating that communications should occur with that field station, the control system responds to that action by initiating communications with that station.

A second plurality of timers is also provided, again one of each of the second plurality of timers is associated with one of each of the remote stations. The second timer may be set at the same time that the first referred to timer is set. However, this timer is set to a value which is somewhat less than the value to which the first timer is set. The second plurality of timers are, in effect, a warning timer indicating to the system that the communication cycle period for any field station has almost expired and if communications are possible with that field station such communications would be desirable. Before communication with a station is initiated on expiration of a warning timer, however, a check is made to see if more urgent communication needs are to be serviced.

A third timer (the integrity timer) is provided which is set when a communication is attempted with any field station. This timer is designed to allow a predetermined period for the response of the field station transmitted to. If the field station does not respond within the time period, this system assumes an equipment failure and does not continue to tie up the communication links in attempting to communicate with that field station.

BRIEF DESCRIPTION OF THE DRAWINGS

A preferred embodiment of our invention is disclosed in the specification when taking in conjunction with the attached drawings, in which;

FIG. 1 is a block diagram of a communication system incorporating our invention;

FIGS. 2A through 2C, inclusive, is a functional block diagram of the functions performed by our system;

FIGS. 6A, 6B and 6C illustrate the decode routine (DECODE):

FIGS. 7A and 7B illustrate the address transmit routine (ADXMT);

FIGS. 13A and 13B illustrates the transmit interrupt routine (TRANSMIT);

FIGS. 14A through 14D illustrate the receive interrupt routine (RECEIVE);

FIGS. 19(a) and 19(b) comprise a block diagram of a portion of the disclosed apparatus.

DETAILED DESCRIPTION

Figure 2A:
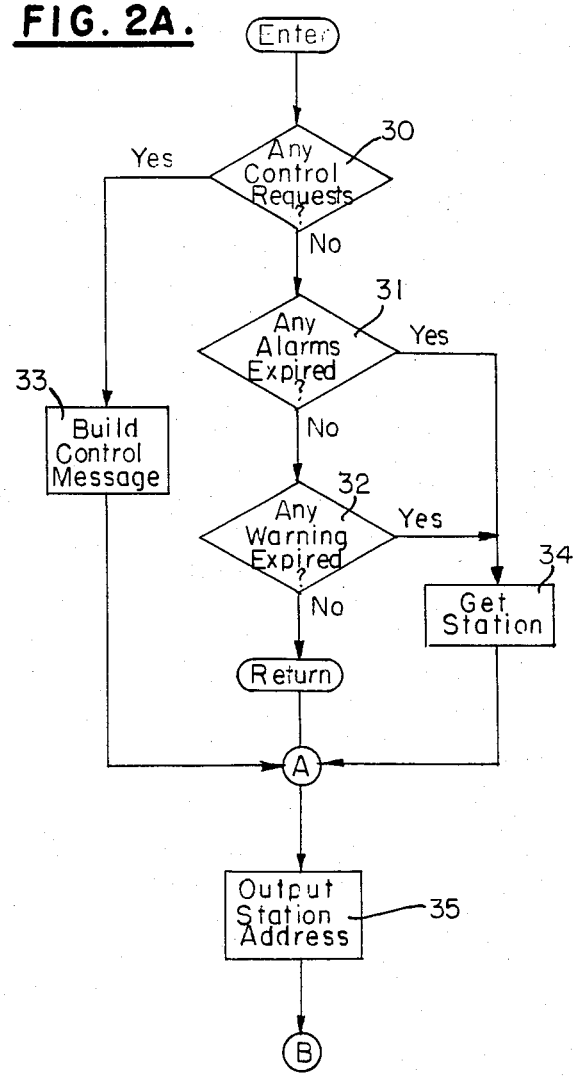

FIG. 1 is a block diagram of apparatus incorporating our invention. FIG. 1 illustrates a master station 10 which includes a central processing unit or digital computer means 15 which is coupled to a modem controller 20. Modem controller 20 controls a modem 25 which is coupled to a duplex communication link 27. Remotely located from the master station 10 are a plurality of field stations illustratively shown as field stations $FS_{11}$, $FS_{12}$ and $FS_{in}$.

In applying the principals of our invention in a centralized traffic control system for railroads the master station 10 may be located at any point adjacent to the railroad track territory to be controlled. The remote field stations can represent apparatus for communicating with the master station and for controlling adjacent railroad track switches and track signals as well as for providing indications to the master station of the field apparatus. Although not illustrated, as is well known to those skilled in the art each field station contains a modem such as modem 25 which includes a transmitter and receiver, a modem controller, such as modem controller 20 and other apparatus to receive and store controls transmitted by the master station as well as to store and transmit indications to the master station. Suitable apparatus which may be employed at a field station is disclosed in the co-pending application of Dansbach et al, Ser. No. 516,849, filed Oct. 21, 1974, the disclosure of which is herein incorporated by reference. As this description proceeds it will become apparent that other field station apparatus could be provided. Likewise, the structure of modem 25 and the modem controller 20 are disclosed in the aforementioned Dansbach et al application. Our invention is more particularly concerned with the control of the communication system by the central processing unit 15. Illustrated in dotted outline in FIG. 1 are additional modem controllers and modems located at the master station 10. The additional modems are illustrated as associated with respectively duplex communication links 28 and 29. Duplex communication link 28 is connected to a second plurality of field stations $FS_{21}$ through $FA_{2n}$ and duplex communication link 29 is coupled to a third plurality of field stations $FS_{n1}$ through $FS_{nn}$. In this fashion FIG. 1 illustrates that a plurality of field stations may be coupled by a single duplex communication link to form a communication system. However, other communication systems such as those connected to duplex communication link 28 and 29 may also be controlled by a single CPU 15 employing the principals of our invention. The second and third pluralities of field stations may be employed to control railroad apparatus on railroad territory contiguous with that associated with the first plurality of field stations. On the other hand, the second and third plurality of field stations may be associated with still other railroad systems wholly unconnected with the railroad system associated with the first plurality of field stations.

In an embodiment of our invention which has been constructed central processing unit 15 comprises the Nova mini-computer manufactured by Data General Corporation. For a description of the Nova computer see "A System Reference Manual for the Nova", published by Data General Corporation, Southboro, Mass. (1970). Those of ordinary skill in the art will understand that other minicomputers would also be adequate and, indeed, if desired, a general purpose computer could also be used which operates with word sizes of 32 bits are greater.

Since the CPU is responsible for scheduling, as well as managing, the communication system provisions are made for storing a model of the system, as a function of the different stations comprising the system or systems being controlled. By this is meant a portion of the memory of CPU 15 is reserved to store information respecting the configuration of each station. For instance, the address to which the station will respond must be stored, as well as a number of control words which a station will accept, the number of indication words that is expected from the station, the station's status, i.e., whether it is a future station, whether the station is out-of-service for some maintenance reason: storage also includes provisions for statistical information regarding the number of communication failures and the particular types of communication failures. In addition, since the communication cycle period is tailored for each station, this is another parameter which must be stored for each station. That is, each station has associated therewith a maximum communication cycle as defined in a time unit. As each station is communicated with a timer is set to a value related to the maximum allowable time between communications. A real time event which will cause scheduling of that station for communications is the expiration of the referred to timer. In order to allow for orderly scheduling a second timer is provided, for each station, which is set to a value which is some fraction of the value to which the first timer is set. The second timer is referred to as a warning time and communications will be scheduled with the station when the warning timer expires.

In addition, the CPU 15 may be provided with controls which are to be transmitted to the station over the communication system. The manner in which these controls are provided is not critical to our invention and apparatus for providing such controls is disclosed in Clarke et al U.S. Pat. No. 3,836,768, issued Sept. 17, 1974. Another system for providing such controls is disclosed in copending application of Murray et al, Ser. No. 525,039, filed Nov. 18, 1974.

The overall sequence is for the CPU 15 to select a station which is to be communicated with. The station may be selected because a control request is pending, or one of the timers related to that station has expired. In any event, the station address is transmitted as a word followed by a control message, if that is desired. Since the communication link is duplex, the addressed field station will begin transmitting back to the master station as soon as it recognizes its address. The first word of the field stations transmission will be the address. The field station will also transmit, following its address, a number of indication words and a check word or words. The master stations transmission may include a number of control words and will conclude with a check word or words. As the address is received at the master station it is checked to determine whether or not the proper station is responding. If the proper station is not responding the master station will not transmit the check word or words which will render the master stations transmission ineffective at any field station. (See the referred to Dansbach et al application). The master station may attempt additional transmissions in order to obtain a proper response. Assuming, that the proper station is responding, the master station will also check the indication message, including the check words in order to determine the validity of the indication message. Again, if the indication message is, for some reason, not considered valid additional communication attempts may be made by the master station. The indication message may also include requests for the master station to retransmit the control message and, if valid, the master station may comply.

Some of the functions referred to above such as checking the validity of indication messages with the use of the check words may be performed by the modem controller 20 as disclosed in the aforementioned Dansbach et al application. In addition, the modem controller 20 cooperates with the CPU 15 on a word basis. That is, when data is orginated at the CPU 15 it is transmitted to the modem controller 20, one word at a time. In between the transmission of a word from the CPU 15 to the modem controller 20 the CPU 15 may be concerned with tasks which relate to other communication systems being controlled. In a like manner the modem controller 20 makes available to the CPU 15 messages from the field stations, one word at a time. Although one duplex communication link, such as communication link 27 will be transmitting and receiving with a single field station at any time, indication words may be received by the CPU 15 from different field stations if they are connected to different communication links.

In order to properly associate indication words with other indication words received from the same field station the memory of CPU 15 is divided into a number of receiver areas, one for each system, such as systems 1, 2 and N illustrated in FIG. 1. As each indication word is received from system 1, for example, it is inserted into the memory in an area reserved for indication messages associated with system 1. The receiver area for any one system need only be as large as the largest indication message which is expected to be received from any field station in that system. This is for the reason that the indication message, once processed will be removed from the receiver area and thus the receiver area will be made available to receive indication messages from other field stations.

Another major area reserved in the memory of CPU 15 is a station description table. A typical station description is illustrated below in Table 1.

TABLE 1

| Typical Station Description Table | |
| --- | --- |
| Word No. | Contents |
| 0 | Site |
| 1 | Station Input Address |
| 2 | Station Output Address |
| 3 | Control Repeat Information |
| 4 | Indication Table Address |
| 5 | Control Table Address |
| 6 | Indication Count/Control Count |
| 7 | Flag Word |
| 8 | Poll Timer |
| 9 | Channel Number |
| 10 | Office Retry Error Counter |
| 11 | Field Retry Error Counter |
| 12 | No-Reply Counter |
| 13 | Over-Run Error Counter |
| 14 | Poly Error Counter |
| 15 | Parity Error Counter |
| 16 | Framing Error Counter |
| 17 | Early Shut Down Counter |
| 18 | Total Error Counter |
| 19 | Number of Station Scans |

As illustrated in Table 1 a station description table includes a plurality of words, some of which model a field stations configuration. In this category are the communication address, and the site at which it is located. Word 6 in Table 1 stores the indication count/control count. The indication count is the number of words that the station is expected to transmit, and the control count is the number of control words which the station is configured to receive. Words 10 through 19 relate to items of statistical information which may be of assistance in maintaining the communication system. Item 18 indicates the total number of errors related to that station and item 19 indicates the total number of times the station has been communicated with. The errors reflected in word 18 are categorized in words through 17 for further assistance in maintenance. The station input address indicates the internal memory address at which indication words from this station will be found. In contrast, word 2 the station output address relates to an address, which when transmitted by the master station will be recognized by the field station.

Another reserved area in the memory of CPU 15 is reserved for a control table. One of these areas are reserved for each system which is in operation. A typical control table is shown in Table 2 below.

TABLE 2

Control Table

| Word No. | Contents |
| --- | --- |
| 0 | Mode |
| 1 | Flag Word |
| 2 | Receiver Device Code |
| 3 | Transmit Device Code |
| 4 | Station Number |
| 5 | Indication Count |
| 6 | Remaining Words |
| 7 | Control Count |
| 8 | Transmit Check Code |
| 9 | Receive Check Code |
| 10 | Control Address |
| 11 | Indication Address |
| 12 | Repeat Function |
| 13 | Dummy Data Out Count |
| 14 | Dummy Data In Count |
| 15 | Dynamic Receiver Address |
| 16 | Field Retries |
| 17 | Office Retries |
| 18 | Integrity Timer |
| 19 | Error Register Code |
| 20 | Read Back Code |
| 21 | Poll Timer |
| 22 | Previous Station Scanned |
| 23 | Alarm Word Address |
| 24 | Alarm Bit Address |
| 25 | Control Word Address |
| 26 | Control Bit Address |
| 27 | Warning Word Address |
| 28 | Warning Bit Address |
| 29 | Field Station Address |

Reference to the illustrative control table above, illustrates that much of the data in the control table comes from the station description table (Table 1). When the CPU 15 desires to work with a particular field station it loads the control table for the system in which the field station is connected from that field station's description table. The uses of the control table and the manner in which the data therein is derived will become clear as this description proceeds.

The memory of CPU 15 also provides for a trio of arrays, an alarm array, a warning array and a control array. Each field station is assigned a particular bit in each array. Thus, if a control request is pending for a particular field station its associated bit in the control array would be set. Correspondingly, if a particular field station's alarm timer expires, the associated bit in the alarm array would be set. Reference to the control table illustrates that the word and bit addresses for the alarm, control and warning arrays for the stations are contained in the control table.

Another reserved area in the memory of CPU 15 is provided for a number of timers. An alarm timer is provided for each field station and, correspondingly, a warning timer is also provided for each field station. In addition, an integrity timer is provided for each system. Thus, when a CPU 15 addresses a particular field station the integrity timer is initiated. If the field station fails to respond before the integrity timer expires the master station assumes that a communication failure has occurred and does not continue waiting for a reply from the field station.

In order to appropriately store the indications from the field an indication table is provided. This indication table includes a word or words for each field station. Each bit position in the indication table for each field station corresponds to the condition of some apparatus, such as the position of track switch, the condition of a track signal or the occupancy condition of a track section. The address for each stations indication table is found in Word No. 4 of the Station Description Table (Table 1) and Word No. 11 of the Control Table (Table 2).

Finally, the memory of CPU 15 also provides an area for a control table. The control table includes a word or words for each of the field stations. Each bit position in the control table corresponding to a field station is associated with the controls that are to be transmitted or have been transmitted to that field station for controlling the position of track switches and track signals and associated apparatus. The Control Table address for each station is found in Word No. 5 of the Station Description Table (Table 1) and Word No. 10 of the Control Table (Table 2).

A more complete description of indication and control tables can be found in the aforementioned Clarke et al patent.

Figure 2B:
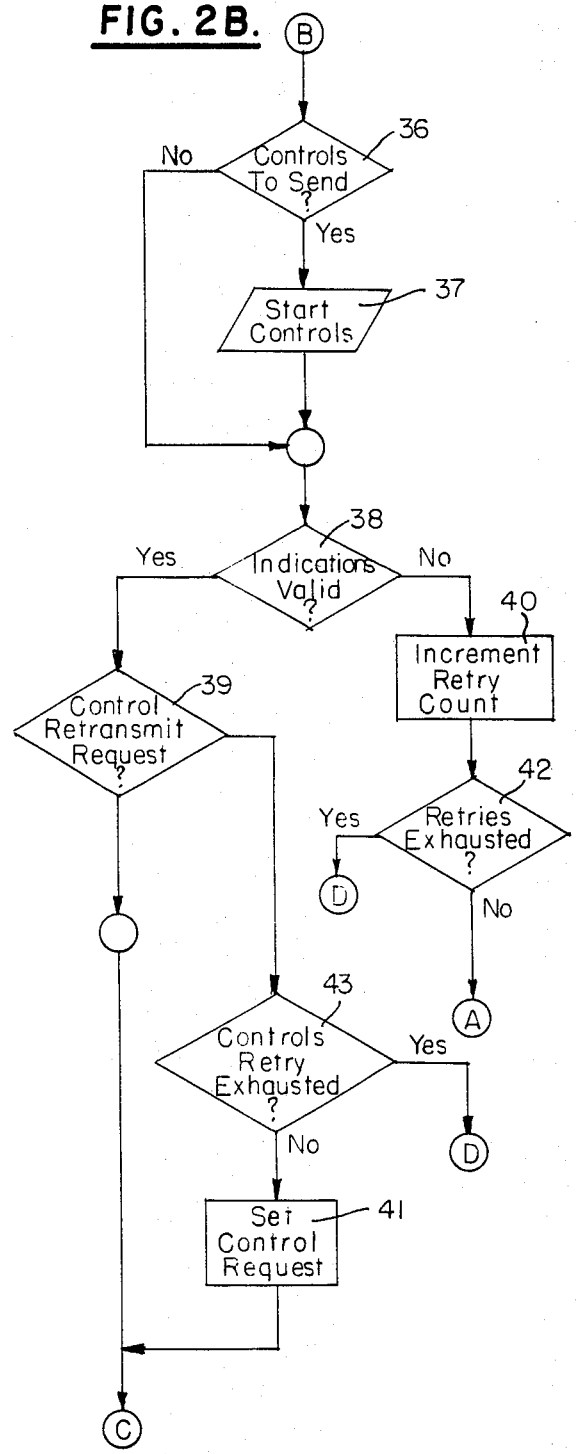

FIGS. 2A, 2B and 2C provide a simplified version of the processor routine which operates on the data, schedules communications in response to the expiration of timers or the presence of control requests, monitors communications, logs failures and controls retries. As shown in FIG. 2A upon entering the processor routine decision point 30 determines if any control request are pending. If there are, function 33 proceeds to build a control message. When the control message is available function 35 outputs the stations address to initiate the sequence of communication. Assuming that no control request are pending decision point 31 determines if any alarms have expired. Assuming that no alarms have expired decision point 32 determines whether any warning timers have expired. If either an alarm timer or warning timer has expired function 34 obtains the station address. Subsequently, function 35 outputs the stations address to again initiate the communication cycle. If no timers have expired the routine returns and awaits for an event to initiate operation.

It should be noted that the processor merely carries communications up to the point of transmitting an address. Once an address is transmitted the balance of the communication cycle, including such functions as sending the control message, if any, and receiving the indication message, are handled by the Transmit and Receive interrupt routines. More particularly as soon as the modem controller indicates the address word has been transmitted a Transmit Interrupt occurs to handle the transmission of the next word. Similarly when a word of the indication message is received by the modem controller a Receive Interrupt occurs to handle receiving that word.

However, if the system determined that communications were necessary and outputs the stations address, decision point 36 (FIG. 2B) determines if there are any controls to send. If there are function 37 starts the transmission of control words. After the control words have begun or if there were no controls to send, decision point 38 determines whether the indications received from the field station were valid. If they were decision point 39 determines if the field station requested a control retransmission. If no such retransmission had been requested the system jumps to point C. However, if a retransmission had been requested decision point 43 determines if the allowable number of retries had been exhausted. If it had the routine skips to point D. However, if the retries had not been exhausted function 41 sets a control request and again directs a system to point C.

If decision point 38 indicated that the indications were not valid then function 40 increments the indication retry counter, and decision point 42 determines if the retries have been exhausted. If not, the routine returns to point A (FIG. 2A) to again output the station address via function 35. This will again initiate the communication cycle with the station in an attempt to obtain a valid indication message. However, if decision point 42 determines that the retries have been exhausted the system skips to point D. The routines which proceed from points C and D are illustrated in FIG. 2C.

The system refers to point C on receipt of valid indication data. Function 44 processes the indications which have been received and decision point 45 determines whether or not any indications have changed. This merely requires a comparison between any indications which have been received and indications which are stored, in the indication table, for the appropriate field station. If indications have been changed then function 46 flags the railroad operating routine that new data is available. On the other hand, if no indications have changed then the routine is completed.

The system refers to point D if the indications are noted as invalid and no retries are allowed. This merely function 47 to flag a system status error report.

Figure 3:
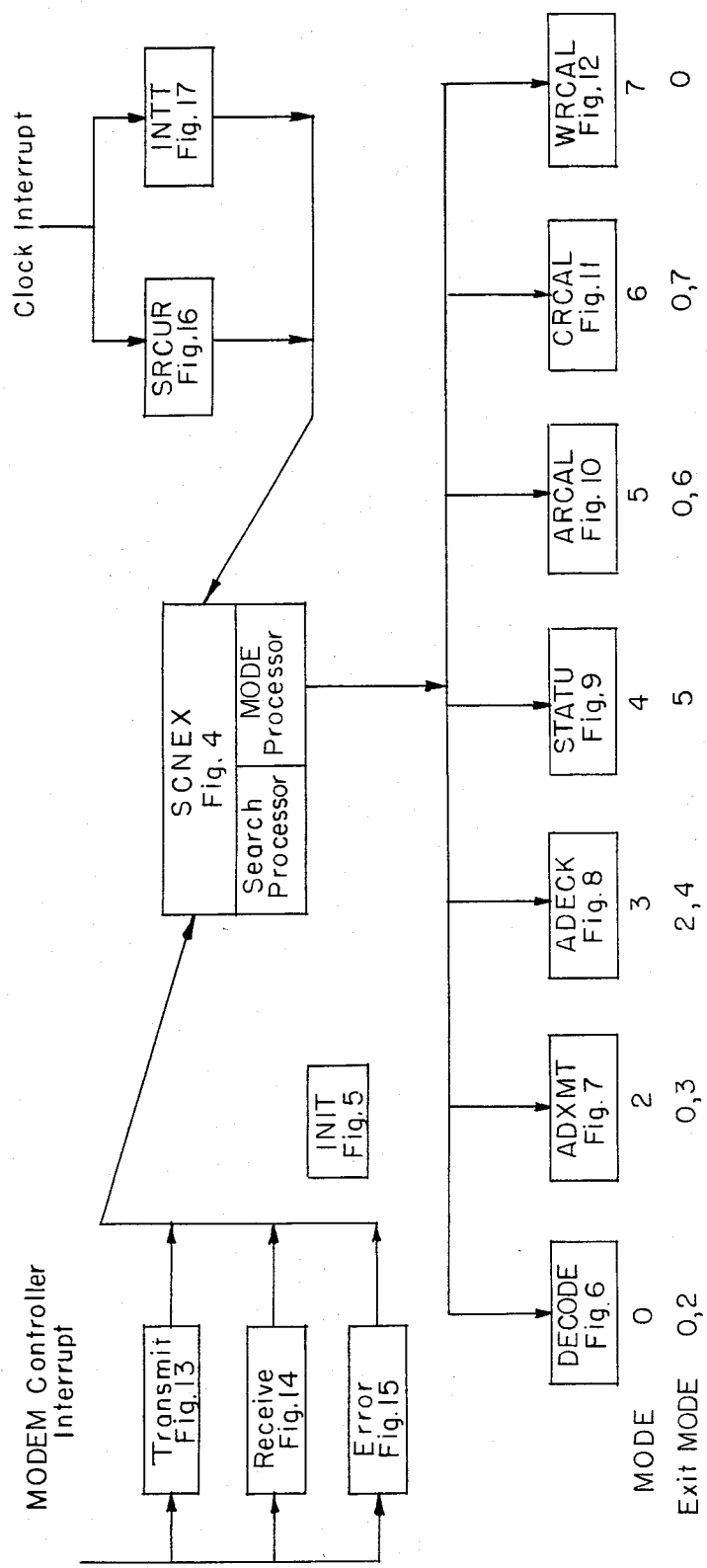
FIG. 3 is an overview of the various major routines which are performed by the processor in the course of managing the system.

In normal operation the processor will select a particular field station with which to communicate. This selection is based on one of a number of criteria, a station may be selected in response to a request to transmit a control, or on the basis of the expiration of a predetermined period of time, either a warning time or an alarm time. In any one communication system only one station would be active at any one time. Although other stations may meet the criteria for communications, communications will not be initiated until communication with the first mentioned field station has terminated. Since the processor can simultaneously control a number of systems, however, communications with one field station may be interspersed with communications with another field station; although these two field stations will be in different systems. FIG. 3 illustrates a system over view in that it indicates the different major routines that are accomplished and the different real time inputs that are available. The scan executive or SCNEX is the routine which coordinates with the other major routines to enable the system to operate. As is illustrated in FIG. 3 SCNEX includes a search processor in which it searches for a field station which meets the criteria for communication. The other major portion of SCNEX is the mode processor which selects one of a number of major routines for operation based upon the internal status of the processor at that time. This system is capable of, and responds to, a number of real time inputs. Reference again to FIG. 1, illustrates that the CPU 15 communicates with a modem controller 20. This modem controller includes transmit and receive means. Operation of either of these means will result in either a transmit interrupt or a receive interrupt. Furthermore, the modem controller also includes means to detect errors in communications and when such an error is detected an error interrupt will occur. Furthermore, the processor sets up a number of timers to time out various predetermined periods. A first plurality of timers, one for each field station, monitors whether or not a station is communicated with in a period time less than a predetermined maximum period. A second plurality of timers, again one associated with each of the field stations, monitors whether or not that station is communicated with in a second predetermined period of time which is less than the first predetermined period of time. Furthermore, when communications are initiated with any station an integrity timer is initiated to ensure that the processor detects a response from the field station within a predetermined period of time. Thus, the system responds to real time inputs from the modem controller 20 in the form of a transmit interrupt, a receive interrupt or an error interrupt. Futhermore, the system also responds to a real time input from a plurality of clocks to either SRCVR (station receiver) or INTT (integrity timer).

A number of the routines employed are generalized in that they may be entered from a variety of points in the communications cycle. In order to enable the processor to be aware of system status at any point in time a number of indicators are provided which are set to distinctive conditions depending upon the extent to which the communication cycle has been completed.

The first of these indicators is the mode in which the processor is running. Reference to FIG. 3 illustrates that each of the routines has a mode number associated therewith. Table 3, reproduced below, defines the mode indicators'.

TABLE 3

| Mode | Mode Indicators Definition |
|---|---|
| 0 | Decode |
| 2 | Address Transmit |
| 3 | Address-Check Back Error |
| 4 | Status Mode Processor |
| 5 | Roll Call Alarm Check |
| 6 | Control Check |
| 7 | Roll Call Warning Check |

Mention has already been made that a portion of memory is set aside to store indication messages received from the field stations. Since each message is treated as a unit there is only the necessity to provide an area sufficient to store a single message from each communication system from which is being managed. Thus, if a processor is operating a plurality of communication systems there will be a plurality of reserved areas, one for each communication system. These reserved areas are called receiver stacks. In addition to storing an indication message each receiver stack has a control word associated therewith which is loaded and read by various portions of the processor. This is another form of status indicator and the definitions of this control word are reproduced in Table 4 below:

TABLE 4

| Control Word | Definition |
|---|---|
| 0 | Receiver Stack Not Active |
| 1 | Input was okay |
| 2 | Communication System Time Out Receiver |
| 4 | Error Interrupt |
| 5 | Scan Initialization |
| 6 | Timer Expired |

Another internal status indicator is the condition code which may be set or reset by various routines. This determines whether the search or mode processor portion of SCNEX is performed.

Before describing the individual routines in detail it would be useful to set out a typical communication cycle, the routines are employed and the functions performed.

After initialization (which only occurs at system start up and which will be treated hereinafter) at a time when communications have been completed with any field station, the SCNEX routine is an idle or wait state, waiting for an event to occur which requires communications. Under these conditions SCNEX would be in the search portion of its routine. If we assume a timer times out then the routine SRCVR will respond. In response to this event SRCVR determine what event has occurred such as an alarm or warning timer has expired, the appropriate address of the associated alarm-/warning words is determined, appropriate bits are set and the control word in the receiver stack associated with the system in which that field station is connected is set to 6 to indicate that a station timer has expired. In addition, the mode in the control list associated with the system in which the field station is connected is appropriately set, either to 5 for an alarm timer expiration or to 7 for a warning timer expiration. At this point SCNEX is called.

SCNEX searches the receiver stacks until it finds the active receiver, i.e., the receiver whose control word has been set to 6. Based on the foregoing SCNEX then selects the appropriate control table, i.e., the control table associated with the communication system which is active. Based on the mode, either 5 or 7, SCNEX calls either ARCAL or WRCAL.

These routines, and the associated CRCAL routines, for a control request, determine the particular station which requires communication. These routines then set the mode to zero. Once that is determined SCNEX is traversed, in the mode routine and decode responds. This routine fetches information from the station description table and places that information in the control table for dynamic operation. The routine also checks to see if the future station bit is set, if it is set the mode is set at 5 which, in effect, bypasses that station and looks for a more active station to be serviced. If the future station bit is not set the station out-of-service bit is checked. If set, the alarm timer is extended and a communication attempt is made. If the attempt is successful the station will be returned to normal operation. The conclusion of decode sets the system mode equal to 2 and returns to SCNEX. In the mode routine, with the mode equal to 2, SCNEX directs the processor to ADXMT. This routine, from the information in the control table obtains and transmits the station address, initiates the integrity timer, sets an address sent flag, sets the first interrupt flag, and resets the condition code to thus return to the SCNEX search routine.

At this point, only the address word has been transmitted. However, the CPU 15, in transmitting the address to the modem controller 20, will then receive a transmit interrupt as soon as modem controller has completed transmitting the address. This transmit interrupt will supervise the transmission of the remaining portion of the message. If it was necessary to transmit controls, the first control word would be generated in response to the transmit interrupt then made available to the modem controller 20. Again, as soon as modem controller 20 completes the transmission of this word, another transmit interrupt is initiated which obtains and transmits the next control word, and so on. The transmit interrupt also supervises the transmission of the proper signals to the modem controller 20 to allow it to transmit the check word or words which terminate a message.

Since the communication system is duplex, as soon as a field station recognizes its address, it will begin transmitting its indication message. Depending on the particular response times involved one or more control words may already have been sent out before the first indication word is received. The first indication word will normally be the address of the field station which is responding. Reception of this word by the modem controller 20 will result in a receive interrupt. The receive interrupt will read in the address. As additional words are received each generates a receive interrupt to bring the new indication word into the CPU 15. In addition, a pointer is provided to point to the top of the receiver stack. As indication words are received, and stored in the receiver stack, the pointer is incremented so that the next indication word will be stored in the next available word location of the receiver stack. At the conclusion of this reception process a receiver interrupt sets the receiver stack control word to 1 to indicate that the input was properly received, if that is the case, and again calls it SCNEX to search for additional active stations. This will ordinarily conclude the communication cycle with any particular station.

However, this cycle can be varied if, for instance, the field station requests a retransmission, or if the indication message received is not considered valid for any one of a number of reasons. Since the transmit interrupt and receive interrupt operate on a word by word basis, the processor 15 can operate with other communication systems in the period between the interrupts. In this fashion simultaneous communications can be occurring with a number of field stations equal to the number of communication systems which are being managed by the CPU 15. It should be stressed however, that within any communication system, only one field station will be active at any one time.

The preceding summary has omitted discussion of INIT and INTT both illustrated in FIG. 3. The first is an initialization routine which only operates at system start-up to initialize the status of all stations. The later, INTT (integrity timer) indicates that a station whose address has been transmitted has not responded that in a predetermined period of time. Another routine which has not been discussed is status (STATU). This routine accomplishes the function of comparing indications from a field station with the indications stored in that field station's indication table. The indications stored in the indication table are those indications which were received from the field station as a result of previous communications. Thus, this routine determines whether any of the indications received from the field station have changed. If a change has occurred, then the routine puts in a call indicating that event. Our communication system is intended to operate with a decision making entity which actually manages the railroad by making decisions as to the desired status of track switches and track signals. This entity may be a railroad operator, or it may be another processor such as that disclosed in the Clarke et al patent or the co-pending application of Murray et al, Ser. No. 525,039, filed Nov. 18, 1974.

Now that the system has been broadly outlined we will discuss the detailed operation with the assistance of the drawings. In order to begin the discussion we will assume that SCNEX has been entered in the search processor by a XMIT from some other routine. This assumption means that the system has been initialized, a station description table has been created and stored, for each station timers have been started and are running and no station is presently being communicated with. The manner in which initialization accomplishes these functions will be explained hereinafter.

When SCNEX is entered in the search processor the first function accomplished, function 51, sets the active system word to one. This designation refers to the communication system designation, and is necessary for the CPU 15 may be managing a plurality of communication systems. The next function, function 52, initializes the pointer to the top of the receiver stack so that it is pointing to the first word for the receiver stack associated with the related communication system. Decision point 53 determines if all receivers have been processed. This is determined by checking the control word of each receiver stack.

Assuming that all receivers have not been processed, function 54 fetches and clears the control word associated with the receiver stack. With this control word, decision point 55 can determine if this stack is active. Reference to Table 4 indicates that a zero control word indicates an inactive receiver stack. A non-zero control word indicates that the receiver stack is active. Assuming that the receiver stack is active, function 58 stores the control word in a particular location and function 59 initializes the pointer to the control table associated with the communication system referenced by the system word designation, in this case, communication system 1.

The next step, at decision point 61 (FIG. 4B) determines whether the control word equals 5. As we will see hereinafter the control word is 5 only during an initialization procedure. If it is, function 65 sets the mode to 6. As has been referred to above, the mode is stored as one word in the control table. Function 65 then merely stores the designation 6 in the appropriate location. Function 63 then fetches the mode which has just been stored and function 64 jumps to the appropriate subroutine as determined by the mode designation.

Assuming, however, that the active control word did not equal 5 decision point 62 will determine if the active control word equals 2, if it did then function 66 sets the mode to 3, function 67 sets up a flag to indicate that an integrity timer has expired, function 63 fetches the mode and function 64 jumps to the appropriate subroutine.

Assuming that the active control word was neither 2 or 5 then function 65, 66 and 67 would not be performed and function 63 would fetch a previously stored mode so that the appropriare jump could be made at function 64.

Assuming, however, that the particular receiver stack selected was not active (at decision point 55) then function 56 would increment the system word. This now would refer to a different communication system, such as 2. Function 57 then calculates the address of this receiver stack. Since the locations of the various receiver stacks are predetermined this function can be performed by merely referencing a table. Subsequently, decision point 53 then determines if all receivers have been processed. The same loop, that is functions 53 through 57 are traversed until all receivers are processed. At that point function 60 calls receiver and SCNEX awaits a further event requiring processing.

In summary then SCNEX searches for an active receiver, when one is found its control word is checked (by decision point 61 and 62) an appropriate mode settings are made; if the control word is equal to 5 (mode equal 6 or 2 (mode equals 3). If the control word is other then 2 or 5 (or zero-if zero the stack would not be active and SCNEX would never reach this point) SCNEX enters the mode processor in accordance with the previously stored mode.

In order to see how the control table can be set to a mode other then 2 or 5 we will now turn to SRCVR which is the routine which responds to an alarm time out or a control request.

As has been mentioned above the communication system of our invention is adapted to cooperate with a decision making entity which determines various controls which are to be transmitted to the field. When such a determination is made the desired controls are entered in a control table associated with the station at which the controls are to be effected. Additionally, a bit is set in a control array. The array includes one bit for each location in the system. The control array is thus one means of communicating between the decision making entity and the communication system. When SRCVR is initiated by the receiver 401 the first decision point 402 determines if a control array flag is set. At the same time, the station number of the station to which the controls are to be sent is located in a register of the CPU. Therefore, if the decision point 402 determines that a control array flag is set function 414 sets the mode equal to 6. Function 415 calculates the system number, that is the identification of the communication system in which the station is connected. Decision point 416 determines if that is a valid station, i.e., if the system recognizes that station as being in the system. If not, function 417 queue's a message that the selected station is not related to a system. In this case, no other functions are performed. The message resulting from the function 417 is an error message. However, if decision point 416 determines that this is a valid station then function 407 calculates the receiver stack address for that system, function 408 sets the receiver stack control word to 6, function 409 resets the condition code, function 410 performs an .XMT to SCNEX. With the receiver stack control word set to 6, that receiver stack would be active, the reset condition code forces SCNEX to be entered at the search entry (see decision point 68—FIG. 4B). Thus, SCNEX will then find the active receiver stack and act appropriately.

However, if a control array flag was not set then decision point 403 would determine if an alarm timer bit was set. As has been mentioned the alarm timers are initiated when communications are had with the station so as to control the delay between successive communications to the same station. If an alarm timer bit was set function 411 would fetch the address of the alarm word associated with the station whose timer had expired. Function 412 would set a bit related to the station in the alarm word, function 413 would set the mode equal to 5 and then functions 407 through 410 would again be performed. The effect of the latter four functions has already been explained.

If decision point 403 determines that an alarm timer bit is not set then functions 404 through 406 are performed. These functions fetch the address of the warning word, set a bit in the warning word and set the mode equal to 7. Subsequently, the same functions 407-410 are performed.

The functions 412 and 405 set appropriate bits in either an alarm word or a warning word. These words exist in arrays, much as the control array, wherein a single bit is provided for each station. The routine FSTAT provides a cross reference function between the array word number and bit number to station numbers to allow ready identification of the station to which each bit corresponds.

Thus, in summary SRCVR responds to the setting of a control array flag or the expiration of an alarm timer or a warning timer. (The expiration of a warning timer is implied by the fact that SRCVR is operating while no control array flag or alarm timer bit is set). The appropriate mode is set, either 5, 6 or 7, the receiver stack control word is set and the condition code is reset so that SCNEX is again called to locate the active receiver and act accordingly.

Figure 10:
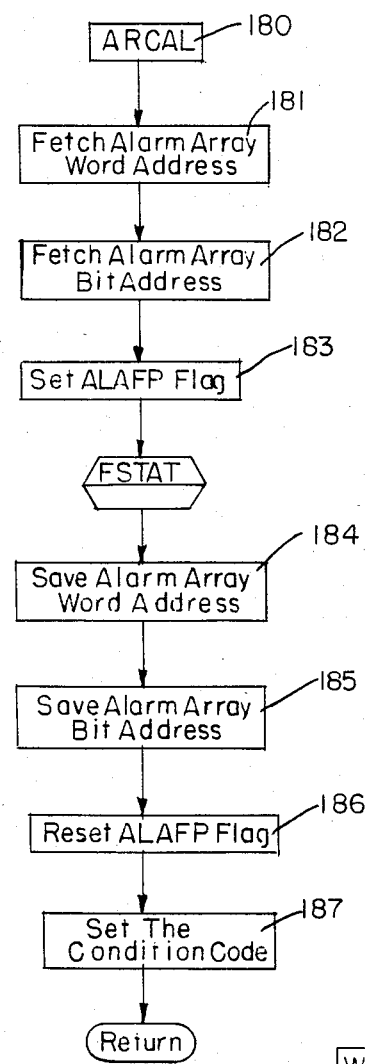
FIG. 10 illustrates the alarm roll call routine (ARCAL)

Assuming that a warning timer or alarm timer have expired or a control request was pending the mode would have been set to either 7, 5 or 6. We will now refer to FIGS. 10-12 to see what occurs when the processor operates in ARCAL (alarm roll call), CRCAL (control roll call) or WRCAL (warning roll call).

Referring first to ARCAL (FIG. 10) we see that function 181 and 182 fetch the alarm array word address and alarm array bit address. The alarm array word address is the address of the first word in the alarm array which may be a multi-word array. For each bit of a word a different mask is available to isolate that bit. The bit address refers to the address at which is stored the first mask. There are, of course, as many masks as there are bits. For a mini-computer that is usually 16 bits. Other computers may use words with more or less bits. This address information is thus saved in appropriate registers and function 183 sets a flag ALAFT (alarm program running). The next function 140 calls a subroutine fetch station (FSTAT). Before proceeding with this routine or FSTAT we shall briefly refer to FIGS. 11 and 12 to see the corresponding functions which are performed in CRCAL and WRCAL prior to running FSTAT.

Figure 11:
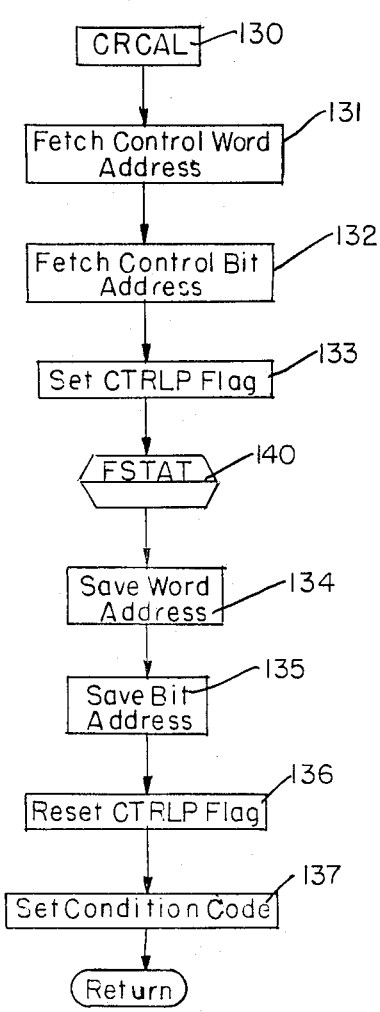
FIG. 11 illustrates the control roll call routine (CRCAL)
Figure 12:
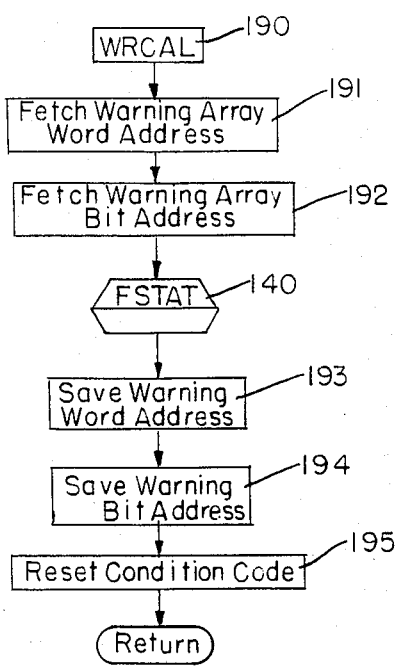
FIG. 12 illustrates the warning array roll call routine (WRCAL)

Referring to FIG. 11 we see that functions 131 and 132 fetch the control word address and control bit address, respectively. These are addresses for the control array which are analogous to the alarm array addresses referred to above. This information is saved in an appropriate register and function 133 sets the CTRLP flag (control program running). At this point FSTAT is entered. Correspondingly, in FIG. 12, and with reference to WRCAL, we see that the two functions there fetch the warning array word address and warning array bit address. Likewise this information is saved in an appropriate register and FSTAT is performed.

Thus, FSTAT is entered with the mode indicating whether a control request is pending or a warning or alarm timer has expired. Furthermore, appropriate registers contain a word address and a bit mask address of the array which is entered.

Figure 18C:
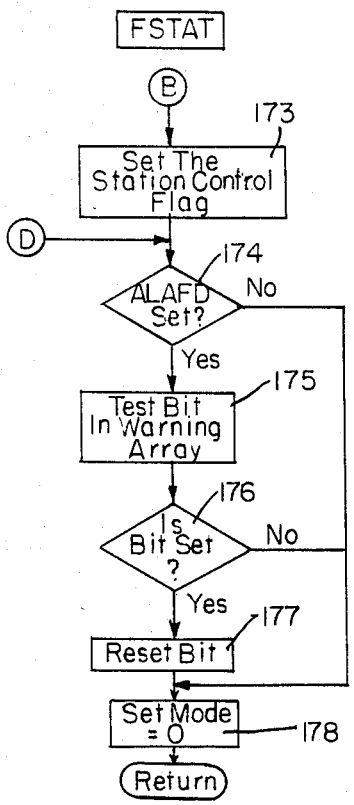
FIGS. 18A through 18C illustrates the fetch station routine (FSTAT)
Figure 18A:
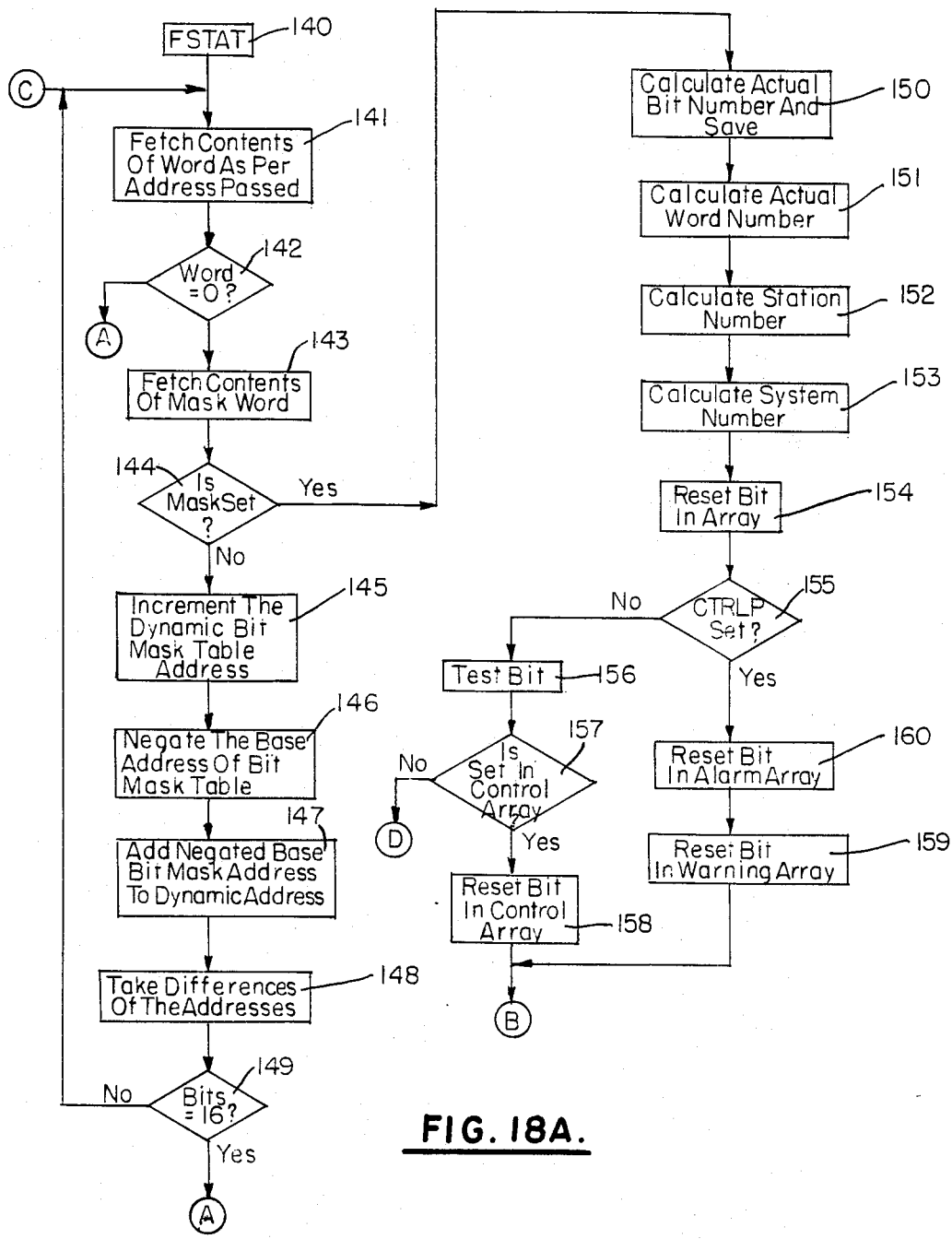
Figure 18B:
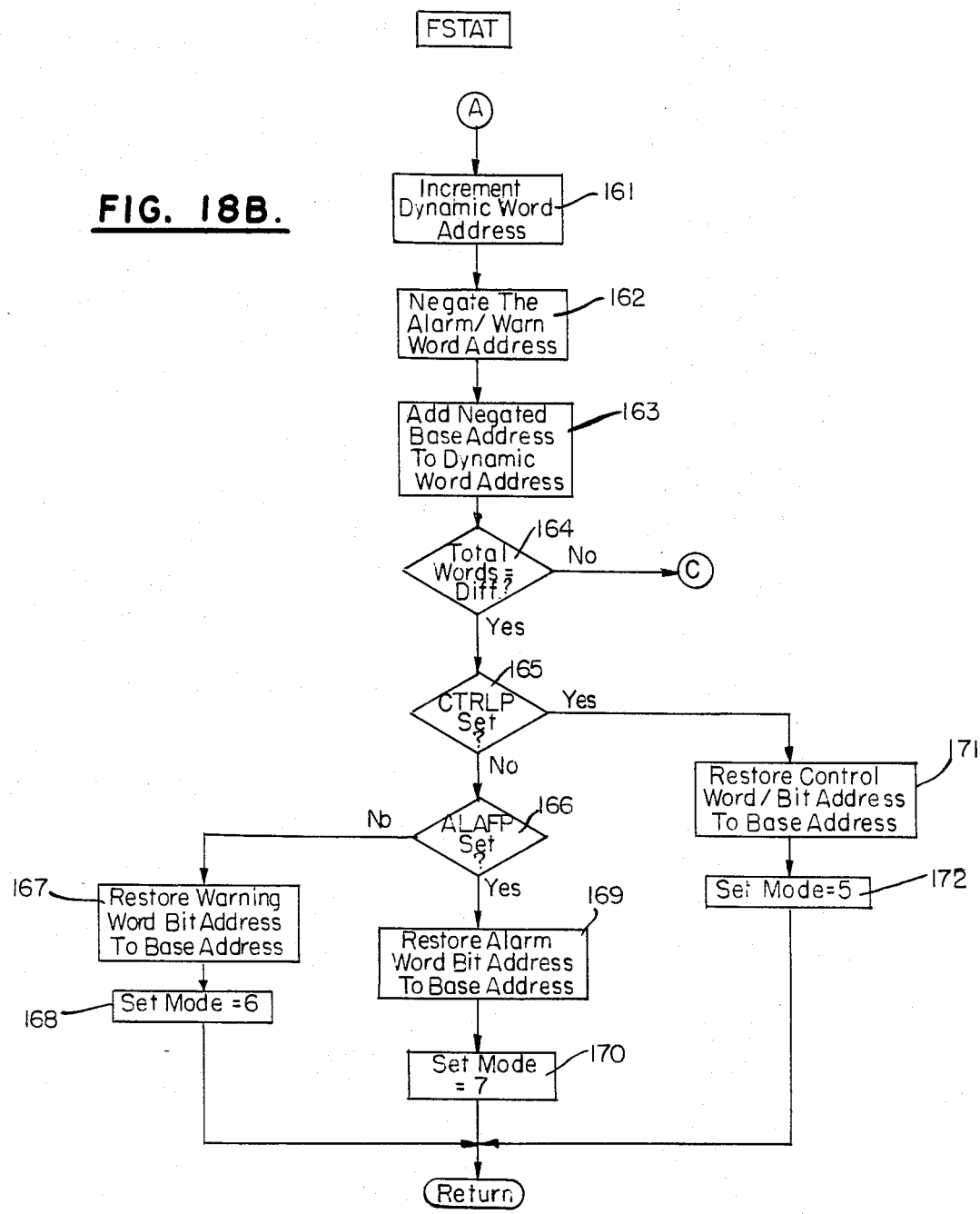

FIGS. 18A through 18C illustrate the functions of FSTAT. Since the control, alarm and warning arrays may be multiple word arrays one of the functions of FSTAT is to find the word in the appropriate array which has a bit set. Another function of FSTAT is to find the appropriate bit in that word which is set. When this information is obtained FSTAT can then derive a station number. At the same time, it must be realized that a control request may have caused this sequence of events but nevertheless an alarm or warning timer may expire in the interim thus causing a corresponding bit in one of the other arrays to be set. Therefore, FSTAT, also checks the bits in the other arrays associated with that station and if any are set they are reset. This is for the reason that setting of any bit will cause communications to the station and thus the system need not respond to the multiple setting of the bits in different arrays to the same station. Finally, FSTAT sets the mode equal to zero and then returns to the program which called it, either CRCAL, ARCAL or WRCAL.

Now in more detail, function 141 fetches the contents of the word as per the address passed. This word will be the first word in one of the arrays. Decision point 142 determines if the word equals zero, that is if all bits are reset. If that is the case, then this word need not be examined and the program skips to point A (FIG. 18B) to obtain a new word, the next word in the array for testing. This is performed by functions 161, 162 and 163. Briefly, a word address previously used is incremented, the base address is negated and the sum is formed. Decision point 164 determines whether the sum equals the difference between the address of the first word in the array and the last word. If not then the address calculated is the address of a new word in the array which must be checked. The program returns through point C to perform that check. Function 141 is again performed to bring a word out of the array and decision point 142 determines if the word is equal to zero, i.e., if all the bits are reset. If they are then the program again jumps to point A to obtain the address of the new word for testing. If all words are checked and they are all found to be reset then the program steps onto point 165. This aspect will be discussed hereinafter. We assume that at some point an address is calculated at which is stored a word, one of whose bits is set. At this point decision point 142 would step to function 143 which would fetch the contents of a mask word. Anding the contents of the word with the mask word allows decision point 144 to determine if a bit isolated by the mask is set. Assuming it is not functions 145 through 149 are performed to obtain a new mask. In essence, the mask address is incremented and the decision point 144 determines whether or not that bit is set. Assuming at some point it is, then functions 150-154 are performed. At this point the actual bit number is calculated and stored, the actual word number is calculated and stored. From this, function 152 determines a station number and function 153 calculates the system number in which the station is connected. Function 154 then resets the bit in the array that was being operated with. Decision point 155 then determines if the control program running flag is set. If it is then functions 159 and 160 reset the bits in the warning and alarm arrays corresponding to the calculated station number. This prevents these bits, if they had been set, from causing further immediate communication with the station.

If the control program running flag was not set then function 156 would test the bit corresponding to the calculated station number in the control array. If decision point 157 determined that the bit was set, function 158 would reset that bit, for the same reason.

If either the control program running flag was set or if the bit in the corresponding array had been set then the program would skip to point B and function 173 would set the station control flag. This is merely a single bit in the station flag word which is found in the station description table. Since the routine has already determined the station number this operation merely requires reference to the description table for that station, and particularly the flag word in that table. However, if neither of the above two conditions were met then the routine skips function 173 by jumping to point D (FIG.

18C). At that point, decision point 174 determines if the alarm program running flag was set. If the routine ARCAL had called FSTAT, of course, the alarm program running flag would have been set (function 183—FIG. 10). If that flag hadn't been set function 175 would test the bit corresponding to the calculated station number in the warning array. If decision point 176 determined that the bit was set function 177 would reset that bit. If the alarm program running flag was not set then functions 175, 176 and 177 are skipped and function 178 sets the mcde equal to zero. That completes operation of FSTAT except for the portion of the routine following decision point 165 (FIG. 18B).

Decision point 165 can be reached only if the routine FSTAT proceeds through an array without finding a word with a bit set. If, at decision point 165, it is determined that the control program running flag is set then functions 171 and 172 are performed to restore the original control words/and bit address and set the mode equal to 5. In this condition, after completing FSTAT and the calling routine (CRCAL, WRCAL or ARCAL, as the case may be) either the mode processor of SCNEX would be entered and a jump would be made to ARCAL, or the search portion of SCNEX would be entered and ARCAL would again be called.

If decision point 165 determined that the control program running flag was not set decision point 166 checks whether the alarm program running flag was set. If the flag was set function 169 would restore the alarm word address and bit address to the base address, set the mode equal to 7 and return to the calling program. Correspondingly, if the alarm program running flag was not set functions 167 and 168 would restore the warning word bit address to the base address, set the mode equal to 6 and return to the calling program. Exiting from FSTAT with the mode set to 5, 6 or 7 would, in effect, continue a search for a bit set in a control array, warning array or alarm array. However, if a bit was set FSTAT would return to the calling program after completing function 178 (FIG. 18C) with the mode equal to zero.

If CRCAL were the calling program functions 134 and 135 would save the word and bit address which had been found by FSTAT, reset the control program running flag (function 136) and set the condition code, at function 137.

ARCAL would be to a like effect except that in this case the alarm program running flag would be reset and not the control program running flag. In either event, the mode is equal to zero and the condition code is set. On returning to SCNEX in the mode processor, since the condition code is set, the mode equal to zero will cause the routine DECODE to be entered.

WRCAL effects a similar result, although in a slightly different fashion. In this event, functions 193 and 194 save the warning word address and bit address but function 195 resets the condition code. Thus, when SCNEX is again entered it is entered into the search processor. At this point all other receiver stacks will be examined. If none are active the receiver associated with the warning timer expiration would be located as active since its stack control word is set to 6, SCNEX will be traversed, and with the mode set to zero function 64 will jump to DECODE.

In summary, if a bit had been set in the control array, the combination of CRCAL when FSTAT would reset that bit, determine the station associated with that bit, reset that stations bits in the alarm and warning arrays and enter DECODE with the identification of the relevant station.

If a bit had been set in the alarm array, ARCAL and FSTAT would locate the bit, determine the station, reset any bits in the control and warning arrays associated with that station, and enter DECODE with the identification of that station. WRCAL and FSTAT would produce the same effect although the search of the receiver stacks could also identify the necessity for communication with other systems. ARCAL and CRCAL prevent this by going directly to the mode processor.

Figures 6A, 6B:
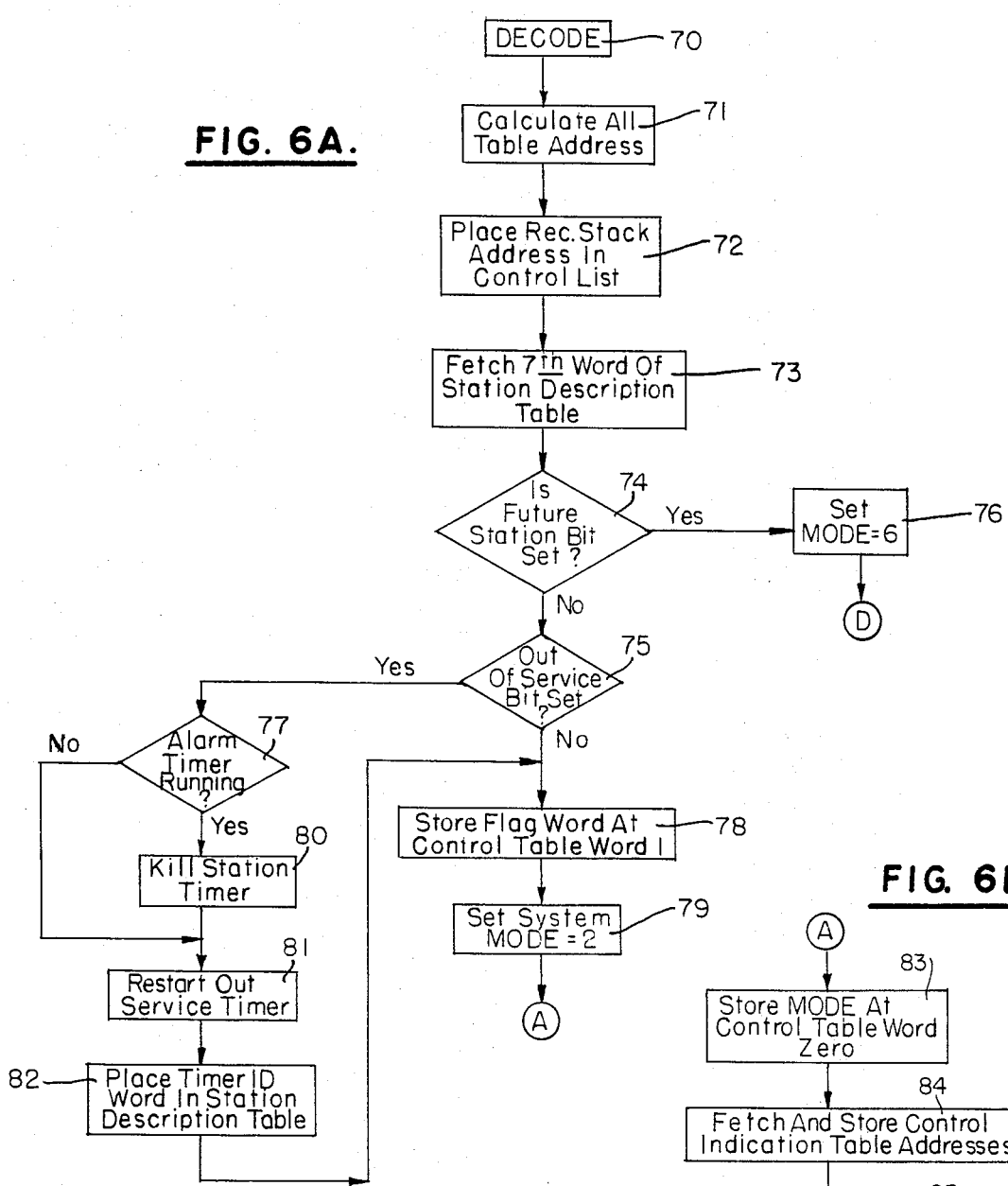

DECODE is illustrated in FIGS. 6A, 6B and 6C. The first function 71 calculates necessary table addresses as will become clear hereinafter. Function 72 places the calculated receiver stack address in the control list associated with the system. Function 73 obtains the seventh word of the station description table. Reference to Table 1 shows that the seventh word is the station flag word. Decision point 74 tests one bit in that word, the future station bit. If this bit is set function 76 sets the mode to 6 and the program skips to point D (FIG. 6C). At this point function 95 sets the condition code and returns. With the condition code set SCNEX would be entered in the mode processor. With the mode set to 6 this would cause CRCAL to be entered. In effect what has happened is that the system has determined that this station is not yet in operation although provision is made for handling this station when it is started up. With the mode set to 6 the system will then look for more active stations. This particular station can be started up by merely resetting the future station bit in the seventh word of the station description table for this station.

Assuming, however, that the future station bit is not set and decision point 75 determines if the out-of-service bit is set. This is another bit in the station flag word. If this bit is set it indicates that at some point the system has determined that the station is "down". The manner in which this bit is set will become clear in discussion of subsequent routines. However, if it is set decision point 77 checks if the alarm timer is running, and it it is, function 80 kills the station timer for its function is no longer necessary. Function 81 restarts the out-of-service timer. This timer can be loaded with a relatively long period of time so that the station is not unnecessarily checked. However, a feature of the system is that this station will be periodically checked and if communications are successful with this station the out-of-service bit will be reset thus putting the station back into normal operation.

Function 82 then places the timer ID word in the station description table so that the timer associated with this station can be identified. Function 78 is then performed either at the conclusion of function 82 or if the out-of-service bit had not been set. Function 78 stores the flag word, the seventh word in the station description table, at the first word of the control table. Then function 79 sets the system mode to 2 and directs the routine to point A. At point A, function 83 stores the mode at the control table word zero. The mode is now 2, having been set by function 79. Function 84 fetches and stores the control/indication table address in the control table. Function 85 fetches and stores the station address in the control table. Function 86 fetches the indication word count and stores it in two locations in the control table. The reason for storing the indication word count at two locations will become clear hereinafter. Finally, function 87 fetches the control flag, which is a single bit in the station flag word. The routine is directed then to point B; decision point 88 checks if the control flag is set. If it is, it means that there is pending controls, which have to be sent. To handle this functions 89 through 91 fetch and store certain information in the control table such as the number of control words, the number of times control transmission should be repeated and an indication in the address that control bits will follow. Function 92 is then performed either after function 91 or directly from the decision point 88. Functions 92 through 94 store further information from the station description table into the control table this information includes the number of office retries and field retries allowable as well as the maximum station timer. Then function 95 sets the condition code and returns to SCNEX.

With the condition code set the mode processor is again traversed and since the mode has been set to 2 (function 79—FIG. 6A) the routine ADXMT is performed.

Figure 7A:
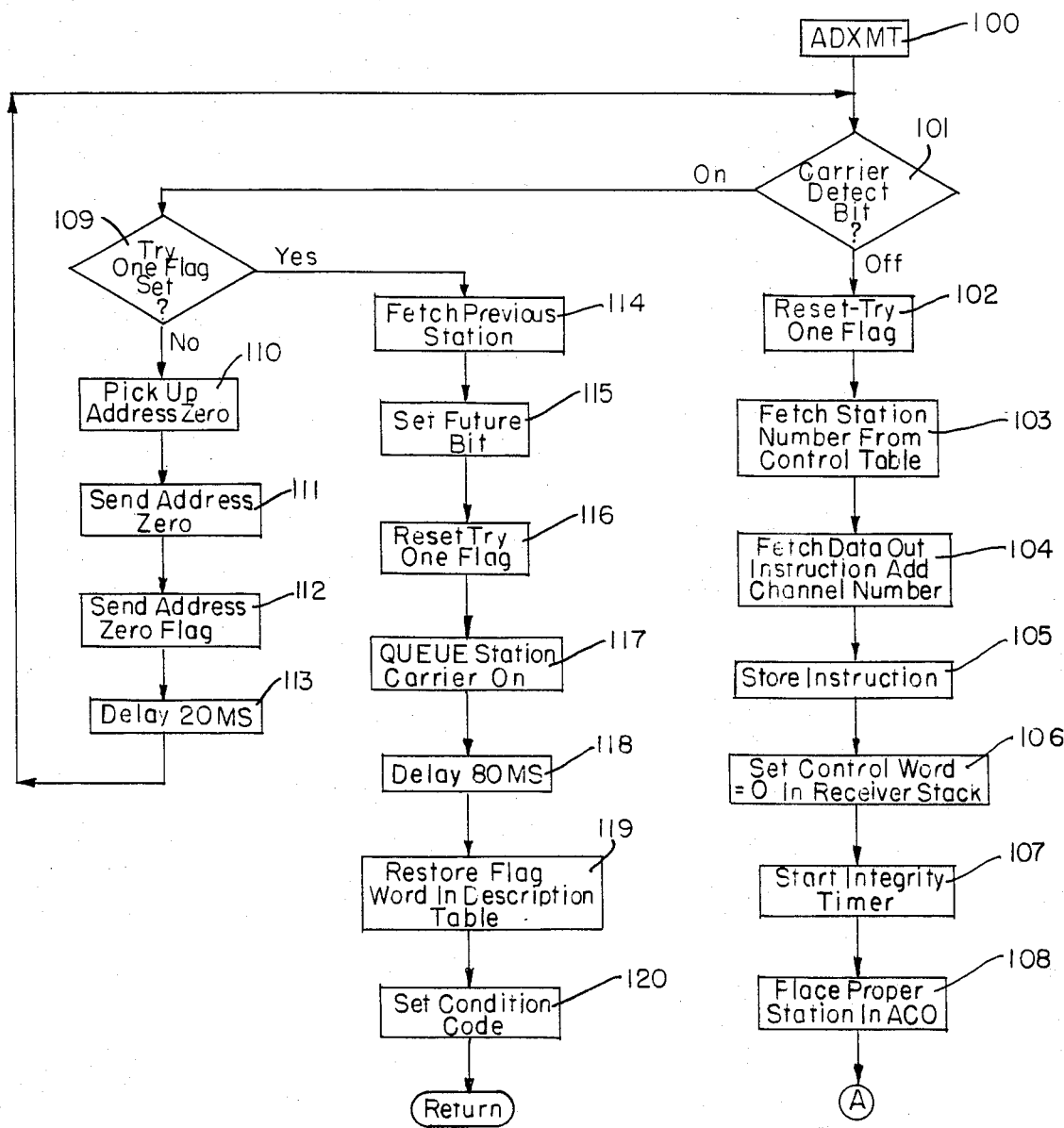

ADXMT is illustrated in FIGS. 7A and 7B. Basically this routine initiates the actual transmission sequence by transmitting, to the modem controller 20 the address of the station to which communications are to be sent. At this point it is desirable to explain some of the hardware characteristics of the modem controller in order to understand some of the functions of this routine. The hardware is disclosed in the co-pending application of Dansbach et al. As is disclosed in that application, one mode of communication failure is a field station transmitter remaining on the line. This will render it impossible for any other field station to transmit indications to the master station. The office modem controller 20 monitors the receive line of the duplex communication link. One of the first checks that this routine performs is to check the carrier detect circuitry in the modem controller 20. If a carrier is on the line then communications can not be effected with any field station and efforts should be directed at removing the carrier. To this end, instead of transmitting the address of the selected field station, an address zero is transmitted. This address is recognized by all stations and its effect is to attempt to turn off the field stations transmitter at each field station.

If this procedure is ineffective the system will assume that the station previously communicated with is the one at which the failure has occurred. It will then retrieve the identity of this station and set the future bit. Furthermore, each field station includes an alarm timer which is designed to disable field station transmitter if communications are not effected in a period less then the period to which the timer is set. If the address zero transmission is ineffective to remove the failed field station transmitter the program then delays this predetermined time and awaits the operation of the alarm circuit to disable that field stations transmitter.

Another function of ADXMT is to start the integrity timer for the station to which a transmission is addressed. This integrity timer monitors this station and if the station does not respond within that time an INTT routine is entered to terminate transmissions with the addressed station.

With the forgoing explanation in mind, the first function of ADXMT is decision point 101 to check the carrier detect bit. Assuming it is on decision point 109 determines if the try one flag is set. This is a flag which is set when an address 0 transmission is tried. At this point, we will assume it is not set and thus function 110 picks up address 0 and function 111 transmits this address. Function 112 sets the appropriate flag and function 113 provides the appropriate delay. At that point then the decision point 101 again checks the carrier detect bit. If it is still on then decision point 109 checks the try one flag. Now, it is set and therefore function 114 fetches the previous station. The identification of the previous station is maintained in the control table and thus it is readily available. Function 115 sets the future bit for that station in the flag word of the station description table, function 116 resets the try one flag and function 117 queue's a station carrier on signal. Appropriate delay is provided by function 118 and then function 119 restores the flag word in the description table. Function 120 sets the condition code to enable the program to continue. Thus, the future bit of the offending station has been set this will prevent further communications with that station hopefully ensuring that the offending field station transmitter will not be again energized to hang on the communication link.

If decision point 101 determines that the carrier detect bit is off then function 102 resets the try one flag which may have been set at some earlier time. Function 103 fetches the station number from the control table and function 104 fetches the data out instruction. Function 105 stores this instruction, function 106 sets the control word to 0 in the receiver stack. Thus, this receiver stack is now inactive. Function 107 starts the integrity timer, which has been referred to above. Function 108 places the station address in the appropriate register for transmission by the data out instruction. The program then skips to point A at which point function 121 performs the data output instruction. This makes available the address of the field station to the modem controller 20 for eventually communication on the communication link. Function 122 sets the address sent flag; this is another bit in the flag word for that station. Decision point 123 determines if the control flag is set. If it is, then controls must be transmitted subsequent to the address transmission and so function 124 sets up the number of control words that are to be sent. Function 125 then sets the first interrupt flag indicating that it is an address that had been sent, function 126 stores the station flag in the station description table and function 127 resets the condition code. In this condition then SCNEX is now traversed in the search routine looking for other active stations.

Figure 13A:
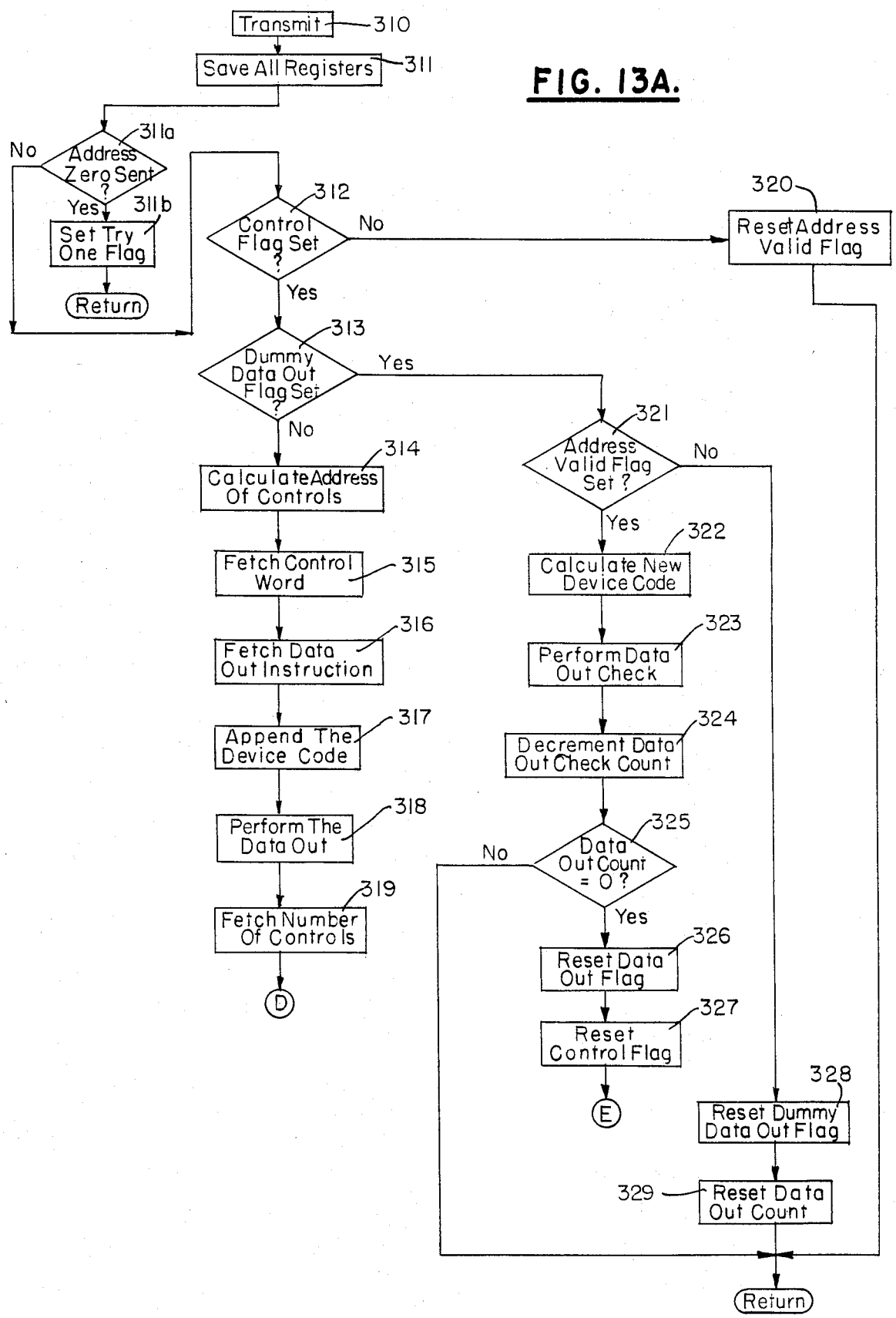

As soon as the modem controller 20 has completed the transmission of the first word, which was made available by ADXMT, a transmit interrupt occurs. This routine is illustrated in FIGS. 13A and 13B. This routine supervises the transmission of controls. It furthermore supervises the transmission of proper signals to the modem controller 20 such that the modem controller 20 is enabled to send proper check word or words at the appropriate time. As is more fully explained in the co-pending application of Dansbach et al entitled Communications System, the messages, in both directions, are checked for parity errors on a word basis and they are also checked on a message basis for errors using a polynomial checking circuit. This enables a number of levels of control. Since the communication is duplex, words may be transmitted from the master station at the same time that words are received from the field station at the master station. The control message transmitted by the master station will not be effective at the field station unless the appropriate check word or words conclude the message. The transmit interrupt logic precludes sending the check word or words until the processor determines that the field station has transmitted its address and this address compares to the address of the field station which is being transmitted to. In this fashion a master station can maintain control over the effectiveness of its message and prevent the message from being effective if the wrong field station answers the call.

Figure 4A:
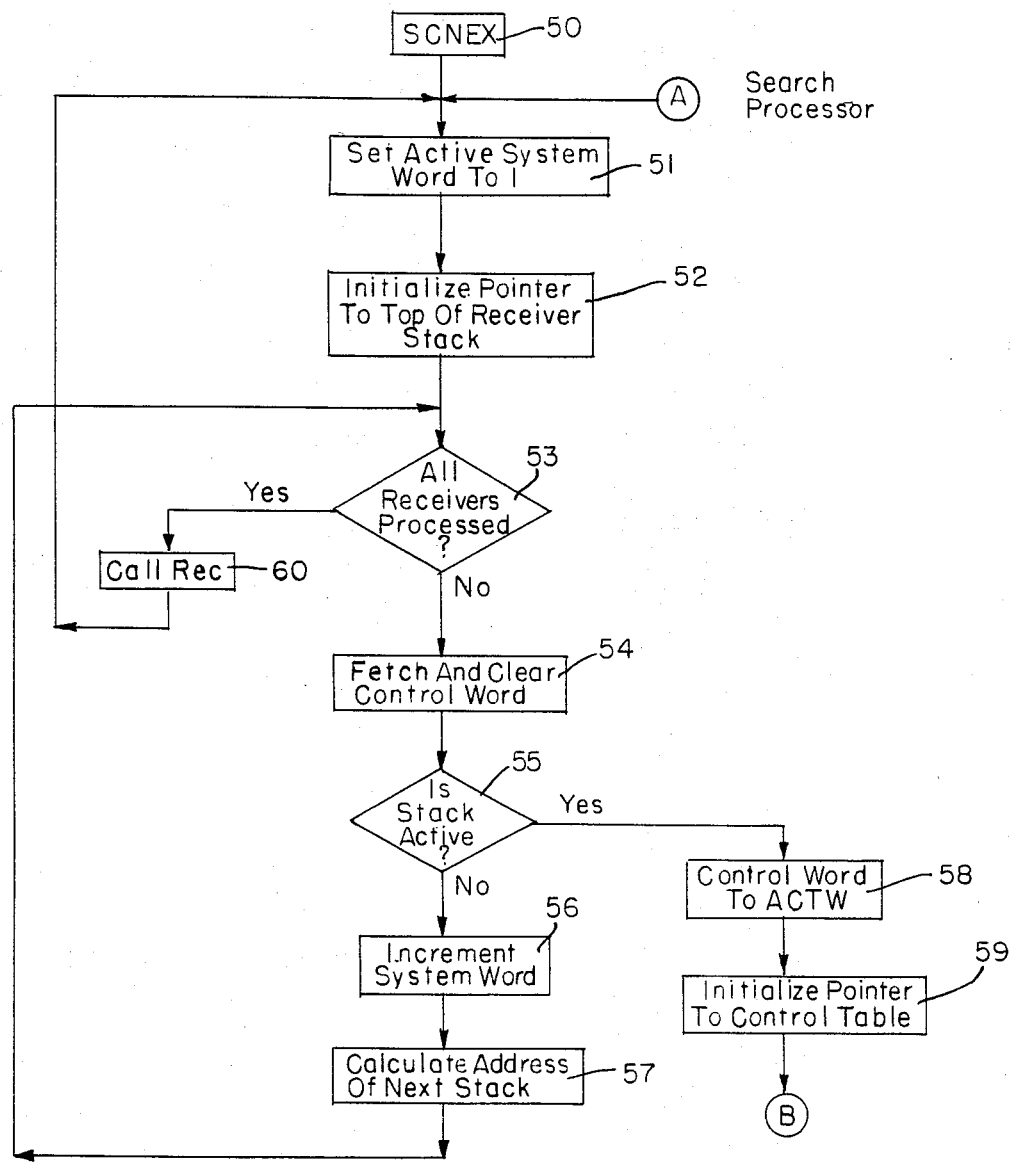
FIGS. 4A and 4B illustrate the scan executive (SCNEX)

With the transmission of the address by ADXMT the condition code is reset. This returns SCNEX in the search processor in which it is available to locate other active receiver stacks for other active communication systems that need servicing. At the time SCNEX is reentered, the receiver stack associated with the first communication system has been cleared by ADXMT (function 106—FIG. 7A). Thus, in FIG. 4A, when decision point 55 is reached, the stack would be found inactive then function 56 would increment the system word and function 57 would calculate the address of the next stack. Thus, at this point in time, the processor examines the condition of other communication systems.

When the address word, transmitted to the modem controller 20 by the CPU 15 during ADXMT, has been transmitted, the modem controller 20 provides a transmit interrupt which sequence is illustrated in FIGS. 13A and 13B.

Since the processor may be processing other systems, the first function of the transmit interrupt function 311 is to save all registers, so that at the conclusion of the interrupt the CPU can pick up where it was interrupted. Decision point 311A determines if the address zero flag was set. If it was, function 311B sets the try one flag and returns. In this case ADXMT will be reentered for the condition code is set and the mode equals 2. ADXMT will then check the carrier bit once again (function 101—FIG. 7A). If the address zero flag was not set decision point 312 determines if the control flag had been set. Assuming it had decision point 313 determines if the dummy data out flag had been set. The following background will be helpful in describing the necessity for this decision point.

As has been mentioned above a control message must be concluded with one or more check words in order for the message to be validated when it is received at the field station. However, the check words are not themselves generated and transmitted by the CPU 15. Instead, the CPU 15 provides a signal to the modem controller for each check word which is to be sent out. The modem controller 20 contains the hardware to generate the check word. When all control words have been transmitted a dummy data out signal is provided to the modem controller 20 which serves to initiate the transmission of the first check word. Since the modem controller which is disclosed in the co-pending application of Dansbach et al is designed to transmit two check words, the routine makes provision for providing two dummy data out signals. Of course, those of ordinary skill in the art will understand that one or more check words could be provided and thus the CPU could be arranged to provide signals for one or more check words, as desirable.

Assuming that only the address had been transmitted and no control words have yet even been transmitted, the dummy data out flag would not be set therefore function 314 would be performed to calculate the address of the controls. This is the address in the CPU memory wherein the controls which are to be transmitted to the field station are resident. Function 315 would fetch a control word, function 316 would fetch a data out instruction, function 317 appends the device code. The device code merely identifies the particular output channel on which the transmission is to be made. Since each of the different channels is dedicated to a different system, this in effect selects the system to which the control word is to be transmitted. Function 318 then performs the data output instruction and function 319 fetches the number of controls and the message which is to be sent. This information is resident in the control table. That routine then skips to point D and decision point 330 determines if the number of control words equal 0 assuming that it does not, since this is the first control word that is being sent, function 331 decrements the number of controls and function 332 restores all the registers which have been saved at function 311. That then concludes the transmit interrupt routine.

As soon as the control word is made available to the modem controller 20, at function 318, transmission is begun. At the conclusion of the transmission of that control word another transmit interrupt occurs. Exactly the same functions are performed, as set out above with the single exception that now when decision point 330 checks the number of control words it is one less then it had been before, because the number had been decremented at function 331. Assuming, however, that the number is not yet 0 function 331 again decrements the number of controls. This procedure is repeated a number of times equal to the number of control words that are to be transmitted. On the last pass decision point 330 would determine that the number of control words did equal 0. Thus, functions 333 and 334 would be performed to set the dummy data output flag and to set the data out count at minus 2. At the conclusion of the transmission of the last control word by modem controller 20, an additional transmission interrupt would occur. At this point, after decision point 312 determined that the control flag was set, decision point 313 would detect the dummy data out flag set, having been set on the previous pass by function 333. Thus, decision point 321 determines if the address valid flag is set. This is a flag which is set by the receive interrupt routine when it detects that the first word transmitted by the field station is in effect the address of the station that was expected to answer. At this point we will assume that the address valid flag is set, but we shall see that this assumption is borne out. As a result, function 322, 323 and 324 are performed to calculate a new device code. Since the signal to the modem controller to send the first check word occurs on the different line then the port to which the modem controller receives a word for transmission, a new device code is necessary. Function 323 actually performs the function of signaling the modem controller 20 to transmit the control word, function 324 decrements the data out check count and decision point 325 checks the data output count to see if it is equal to 0. Assuming it is not, that is the completion of the transmit interrupt routine on this pass. As soon as the check word which is generated and transmitted by the modem controller 20, has been completely transmitted another transmit interrupt occurs. On this pass the data out check count will be decremented to 0 and thus when decision point 325 checks it, functions 326 and 327 will be performed. This resets the data output flag and resets the control flag, in the control table. The routine then skips to point E at which point functions 335 and 336 are performed. This resets the address valid flag and fetches the number of indication words to see whether they all have been received. Decision point 337 determines whether they have all been received and if not the routine is concluded. If all indication words have been received then the routine skips to the receive interrupt routine at point C via function 338.

Actually in a time sequence the receive and transmit interrupts are interleaved: with that understanding we will now review the receive interrupt routine which is illustrated in FIGS. 14A, 14B, 14C and 14D. The purpose of the receive interrupt is to supervise the reception of indication words from the field station.

The first function, 341 calculates the table addresses, that is the control table address related to the system in which the interrupt was received. Decision point 342 checks the control word of the receiver stack. A control word equal to one indicates active stack with an input has been checked and found valid. However, a receive interrupt should not occur when the stack control word equals one, because that is only set to one and at the conclusion of reception of all indication words. Therefore, if the control word is set to one functions 359 and 360 are performed to acknowledge the interrupt and merely increment the total error count. The actual word received is ignored.

Assuming, that the control word bit is not set to one then decision point 343 determines if the dummy data in flag is set.

The dummy data in flag provides a similar function to the dummy data out flag which we saw in the transmit interrupt routine. In order for the modem controller 20 to validate an indication message from the field station, the message must be concluded with the proper check word or words. However, the checking operation goes on in the modem controller and the modem controller merely signals the CPU 15 that one or two check words have been received. If the right number of check words are received but the bits indicate that the message is invalid, the modem controller will signal an error interrupt which is handled by another routine. Merely receiving the proper number of check words will satisfy the receive interrupt routine.

Assuming however, that the modem controller has received the address as the first word of the indication message, dummy data in flag would not be set, functions 344 and 345 would be performed to read the word from the modem controller and calculate the control table address. Decision point 346 determines if the address sent flag is set. This flag is set by the routine ADXMT when the address is transmitted. If this flag is not set it means the station is responding without having been interrogated. This is in effect another error condition, and the routine terminates and ignores the received word.

Figure 14A:
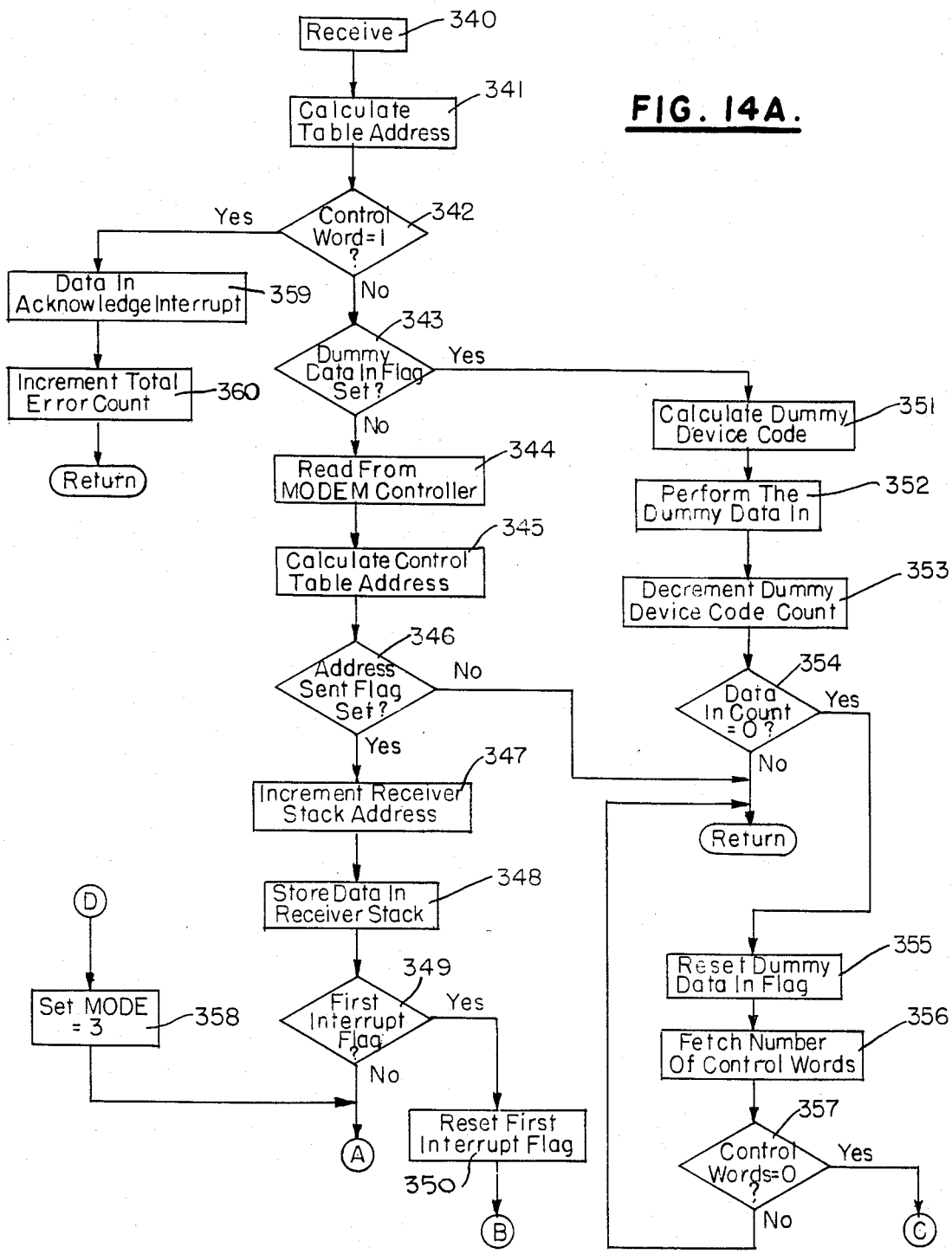

However, assuming the address sent flag was set function 347 would increment the receiver stack address and function 348 would store the data in the receiver stack. Actually this is the received address which is now stored. Decision point 349 then determines if the first interrupt flag is set. The first interrupt flag is set by the routine ADXMT to indicate that this is an address that is being received. Assuming that the flag is set function 350 resets the first interrupt flag and skips to point B in the routine, which is illustrated in FIG. 14B. Function 361 fetches the transmitted address, from the control table and function 362 substracts the received address, which is available in the receiver stack. Decision point 363 determines if the address is okay, which merely means the result of the substraction is 0. If it is not, the routine skips to point F (FIG. 14) at which functions 388 and 389 are performed to fetch the station's description table for the active station and set the error code, received address does not compare, and then jump to point D (FIG. 14A) where function 358 sets the mode equal to 3 and then jumps to point A (FIG. 14C) where function 379 obtains the number of indication words, decision point 380 determines if they are equal to 0. Assuming that this was the address word, decision point 380 would determine that the number of indication words was not 0 and function 381 would set the receiver stack control word to 0, an inactive receiver stack and then return. With the mode equal to 3 the routine ADECK is performed (see FIG. 8).

The function of this routine is to handle the condition caused by error in the received address. The first function 241 through 243 obtains the control list address, stops the integrity timer and decrements the office retry count. The control table contains an allowable number for the number office retries of communications. Function 243 decrements this count and decision point 244 checks the result to see if it is 0. If it is 0 function 245 sets the out-of-service bit for this field station. A number of statistical entries are made at functions 246, 247 and 248. Function 249 sets up a no-reply message, which is the effect of a message which has an erroneous address. Function 250 queue's the message and function 251 sets the mode equal to 6, a control array check and finally the function 252 sets the condition code such that when SCNEX is returned to, it is returned to in the mode processor.

However, assuming that the office number of retries does not equal to 0 functions 253, 254 and 255 would restore the number of words expected that is the number of indication words, restore for a station retry and set the mode equal to 2. Then function 252 sets the condition code such that, SCNEX is entered in the mode processor, and with the mode equal to 2, ADXMT is again transmitted to attempt to raise the station. Since the office retry counter had been decremented (function 243) if the same events occur the office retry counter would again be decremented. Until at some point, it was decremented to 0 and thus the functions 245 through 251 would be performed, as outlined above.

However, returning now to FIG. 14B if the address check was okay, decision points 364, 365 and 366 make certain checks on the contents of the address word. For instance, if the address word indicates that no message follows the routine it skips to point G to set the error code to bad data from field.

Figure 8:
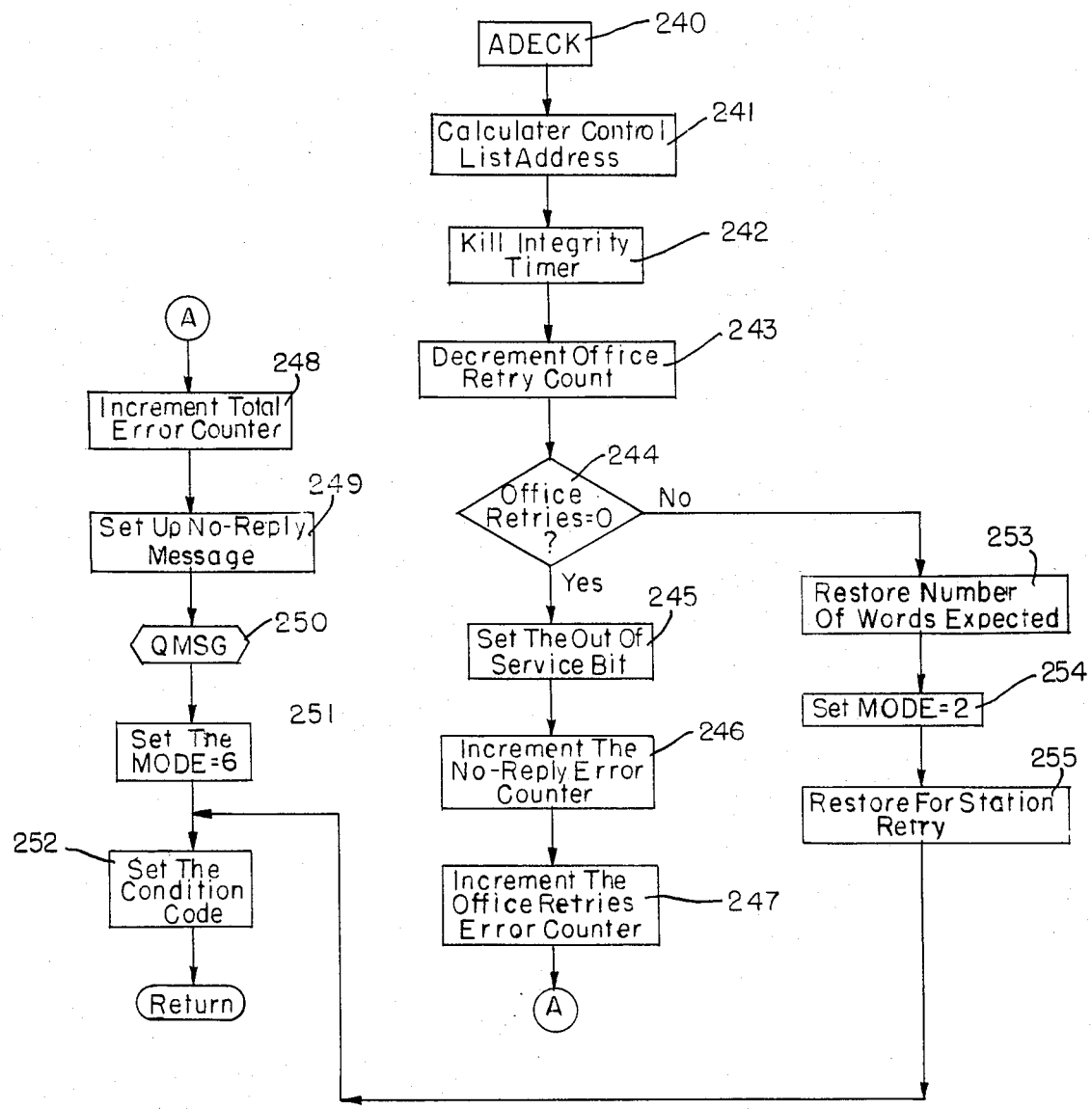
FIG. 8 illustrates the address check routine (ADECK)

Assuming, that decision point 364 is properly passed, decision point 365 determines if the message follow bit equals one. If it does not, it means that an indication message will not be following from the station and the routine skips to point H to set an error code equal to no indication request bit. Either of these two paths end up at point D (FIG. 14A) to set the mode equal to 3 and eventually perform a ADECL (FIG. 8).

Decision point 366 then checks the retransmission bit. If set, indicates that the field station is requesting retransmission. If it is set decision point 369 determines if the control flag was set. If it was, then the field station is actually requesting a retransmission of controls. If it was not this is an error condition and function 370 is performed to decrement the field retry count. Decision point 371 determines if the field retries have been decremented to 0. If not functions 376 and 377 set the mode equal to 2, set the control flag and the routine jumps to point A at which the number of indication words received is checked. If non-zero the number of indication words is decremented by function 380A. Assuming at this point that the number of indication words that are remaining has not yet been reduced to 0, function 381 would set the control word (of the receiver stack) equal to 0 indicating an inactive receiver stack.

Assuming, however, that the retransmission bit was set and the control flag was also set, then functions 370 through 375 would be omitted, function 378 would merely set the address valid flag, set the mode equal to 4 and then again jump to point A. We have seen the function of the address valid flag in discussing the transmit routine. In particular, decision point 321 (FIG. 13A) inhibits the signaling of the modem controller 20 from transmitting the check word or words to validate the control message until the address valid flag is set. This assures, that if an erroneous station responds to the message, the controls transmitted will not be effected regardless of where they are received since the check words will not conclude the message.

With the mode set to 4 now as soon as the SCNEX routine is again entered, at the mode processor, the status routine (STATU) would be performed to check the received indications. As yet, however, only the first word has been received so SCNEX will not be referred to.

If the retransmission bit had not been set function 367 would set the address valid flag (instead of function 378) and function 368 would again be performed as well as functions 379 through 381 before a return is made.

This same route, that is functions 341 through 349 would again be performed. However, on the second pass through the route, the first interrupt flag is no longer set, therefore the routine would jump directly from decision point 349 to function 379 (FIG. 14C) and continue checking the number of indication words remaining. On the last pass through this route, when decision point 380 determines that the number of remaining indication words equal 0 functions 382 and 383 would be performed to set the dummy data in flag and set the dummy data in count to minus 2.

When the next word is received by the modem controller 20, which is the first check word, another receive interrupt is generated. However, on this pass, when decision point 343 is reached it determines that the dummy data in flag is set. Therefore functions 351 through 353 are performed to calculate the dummy device code, perform the dummy data in, that is allow the modem controller to accept the check word and decision point 354 would then determine if the data in count equals 0 yet. If not, that concludes this pass through the receive interrupt routine. Note that the CPU does not store the received word which is actually the check word. When the correct number of check words has been received, the dummy data in count would equal 0, and function 355 through 356 are performed. This resets the dummy data in flag, fetches the number of control words and then decision point 357 determines if the number of control words are equal to 0. That is, determines if the number of remaining control words to be transmitted is a positive number. If it is that concludes the receive interrupt routine at this point. As we saw, in reviewing FIG. 13B, when the transmit interrupt routine has supervised the transmission of last check words, function 337 determines whether the number of indication words is equal to 0 if it is then we jump to point C in the receive interrupt routine, which is shown in FIG. 14C. Thus, the receive interrupt and transmit interrupt routines are interlocked. It is not until both the number of control words and indication words are equal to 0 that the receive interrupt routine achieves point C (FIG. 14C). At this time, communications with the station are complete, all control words have been transmitted, as well as the check words, all indication words have been received as well as the check words. Thus, function 384 resets the address sent flag and function 385 sets the control word (in the receiver stack) equal to one. This indicates that the input from the field station, was okay. Function 386 puts in a .IXMT to SCNEX and then function 387 restores all registers which have been disturbed in entering the interrupt.

It will be recalled, that in the first pass through the receive interrupt function 368 had set the mode equal to 4 (FIG. 14B) thus, when SCNEX is now entered it is entered at the mode processor, since the condition code remains set, then the routine STATU is entered.

Figure 9A:
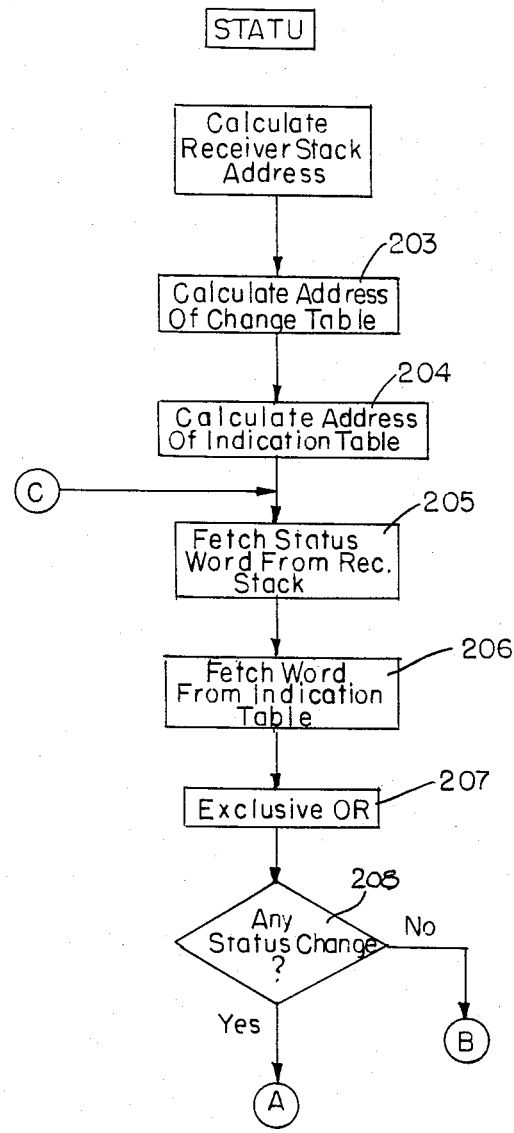
FIGS. 9A, 9B and 9C illustrate the status routine (STATU)
Figure 9C:
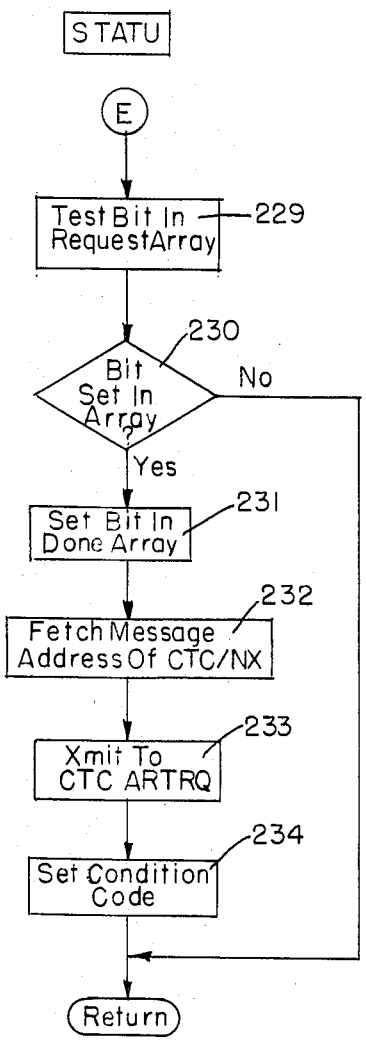
Figure 9B:
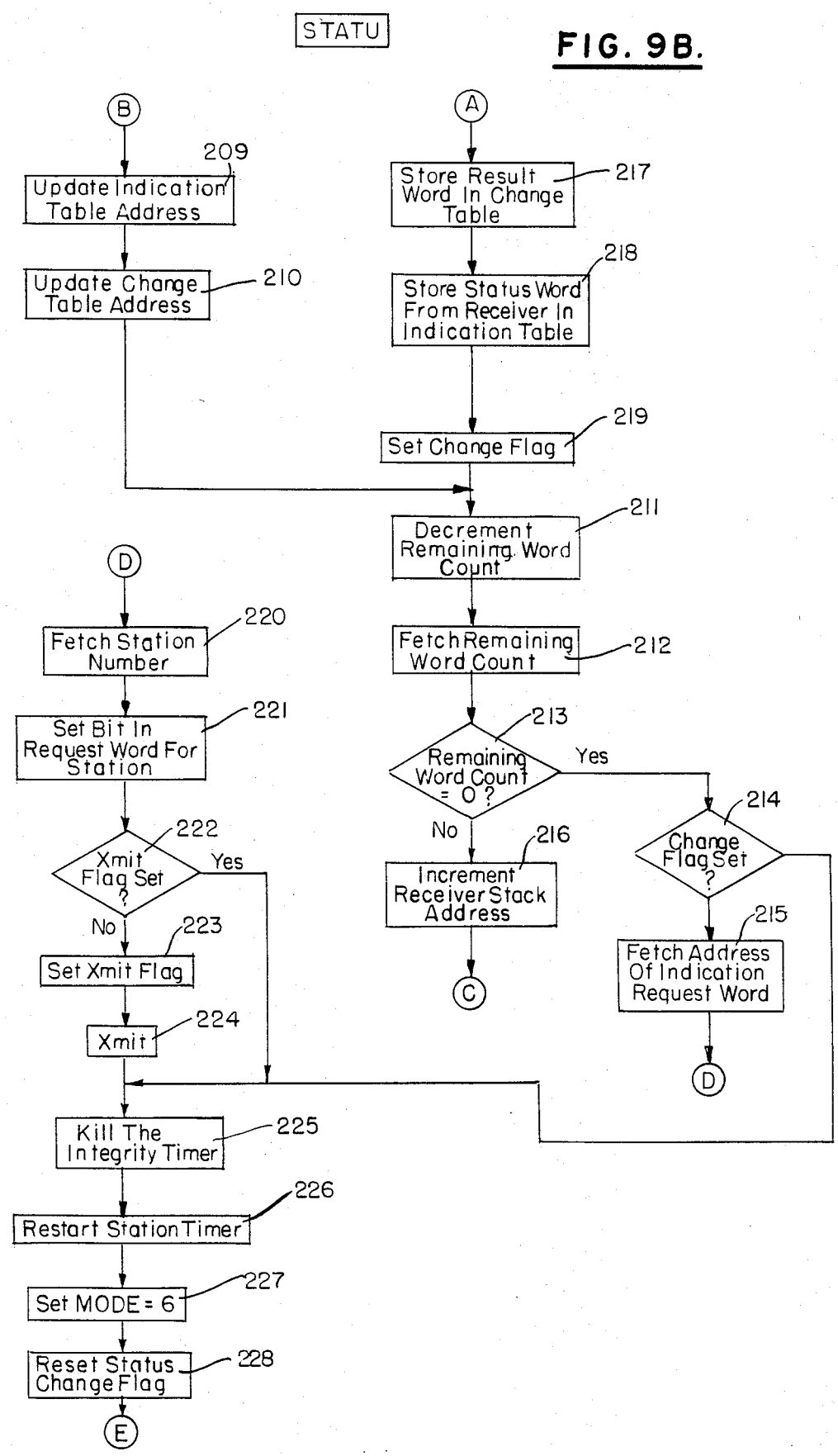

STATU is illustrated in FIGS. 9A and 9B. The overall function of this routine is to compare each individual indication bit in the indication message which has just been received, with the corresponding indication bit for that station which is contained in the indication table. Of course, the bits contained in the indication table resulted from previous communication with the station in question. If all corresponding bits are identical, no changes have occurred at the field station and processing can be concluded. However, if there are indication bits that have changed, STATU determines which bits have changed and puts in a call to the decision making entity to notify it that conditions in the field have now changed.

In detail, function 201 calculates the receiver stack address for this system. At this point in time the receiver stack is the location at which the indication message is being stored.

Function 203 determines the address of the change table, that is the indication change table which will be loaded with data to indicate those bits which have been changed. Function 204 determines the address of the indication table for this station. Functions 205 and 206 fetch respectively words from the receiver stack, which contains a new indication message and from the indication table which contains information respecting the previous conditions at the station. Function 207 performs an exclusive or between these two words and decision point 208 indicates whether any status changes have been effected. If no status changes are evident the routine skips the point B to update the indication table address and the change table address. This merely sets pointers to point to the next word in the indication table and the next word in the change table. Function 211 then decrements the remaining word count function 212 fetches the remaining word count. Decision point 213 determines if the remaining word count is 0. If it is not then function 216 increments the receiver stack address and jumps back to point C (FIG. 9A) at this point two new words are obtained. One from the receiver stack whose address had been incremented at function 216 and another from the indication table whose address had been incremented at 209. These two words provide the input for the exclusive OR function 207 and decision point 208 again determines whether any status changes exist.

If at any point in this process decision point 208 determines that there is a status change, the routine goes to the point A instead of point B. Function 217 stores the result of the exclusive or operation in the change table. This provides information as to which bits have changed. Function 218 stores the status word which indicates the new status from the receiver stack into the indication table for permanent storage. Function 219 sets the change flag for later processing. The processes 217 and 218 automatically update the indication and change table addresses for the remaining readout in comparison operations which will be performed when point C is again entered. After a number of words have been retrieved and compared the remaining word count, at decision point 213, will be 0. At this point, decision point 214 checks to see if the change flag is set. If it is not then function 225 kills the integrity timer for this station. The integrity timer had been initiated when the address was transmitted. Now that the indications have been received and processed we can stop the integrity timer. Function 226 restarts the station timer on this station to time out a new communication cycle. Function 227 sets the mode equal to 6 to set the stage for another control array check. Function 228 resets the status change flag for further processing and then the routine jumps to point E (FIG. 9C).

The functions shown in FIG. 9C provide a portion of the intercommunication functions between the communication system disclosed in this application and a decision making entity. In particular, function 229 tests the bit in the request array. This array is set when an indication change is detected but it is not possible to XMIT to the decision making entity because it was busy. Thus, if decision point 230 determines that if a bit is set in array then function 231 sets the bit in a done array and function 232 fetches the message address of CTC/NX, the decision making entity. Function 233 then XMITs to CTC to indicate that an indication change has been detected and processed. Finally, function 234 sets the condition code for a return to SCNEX.

However, if the change flag had been set decision point 214 would direct the routine to function 215 to fetch the address of the indication request word and then skip the program to point D. Function 220 fetches the station number and then function 221 sets the appropriate bit in the request word for this station. Decision point 232 determines if the XMIT flag is set. It it is then functions 225 to 228 are performed. This is an indication that an attempt has been made to XMIT to the CTC/NX but that is not possible and therefore the flag was set. However, if that flag is not set function 223 then sets the flag and function 224 attempts an XMIT and then functions 225 through 228 are performed. Thus, if no changes have been detected when the routine was entered at point E, decision point 230 would determine that no bit is set in the array that would conclude the routine.

Now with the mode 6 and the condition code set SCNEX is returned to a mode processor and a control array check is made.

Figure 15A:
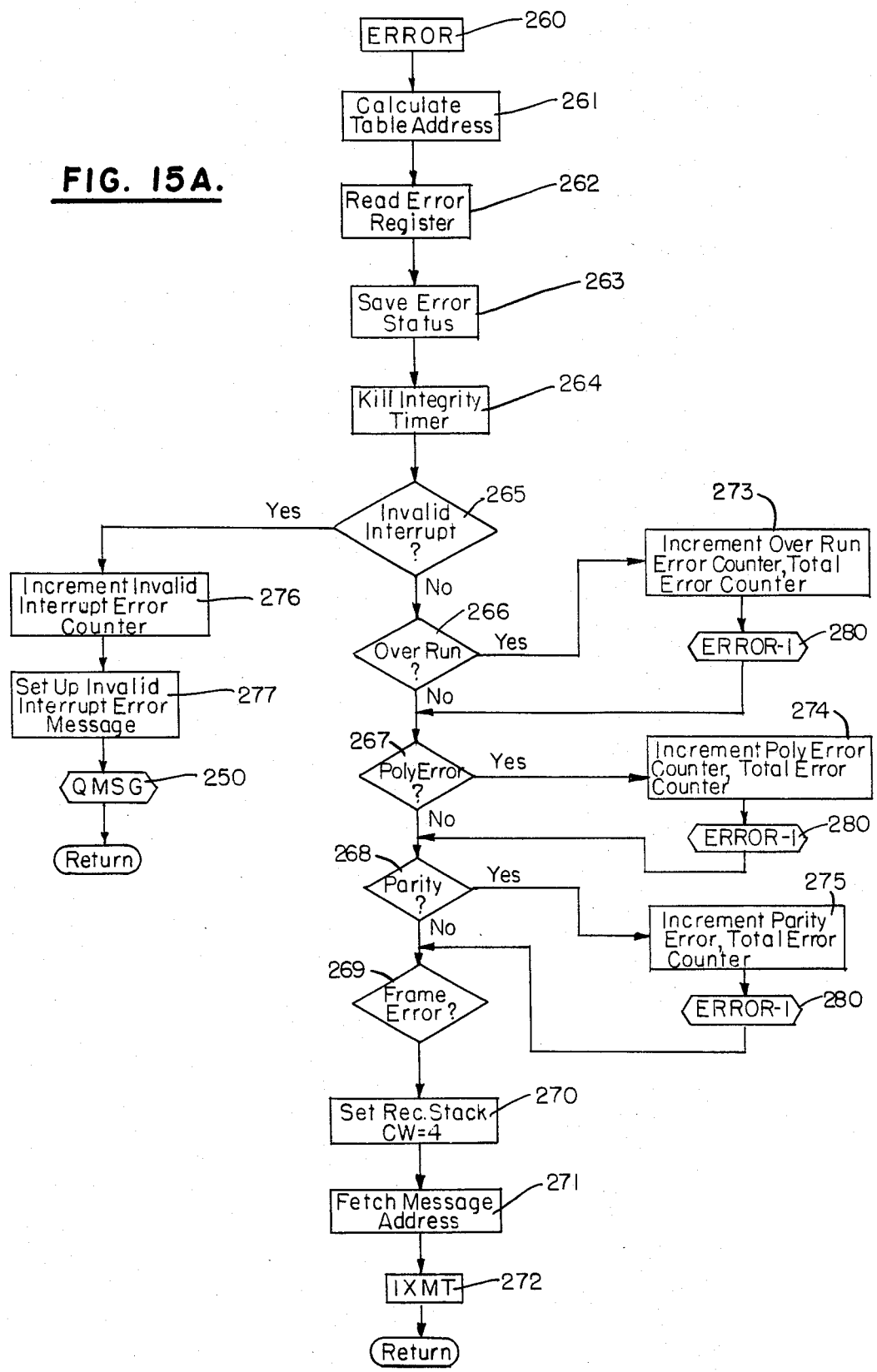
FIGS. 15A through 15C illustrate the error interrupt routine (ERROR)
Figure 15B:
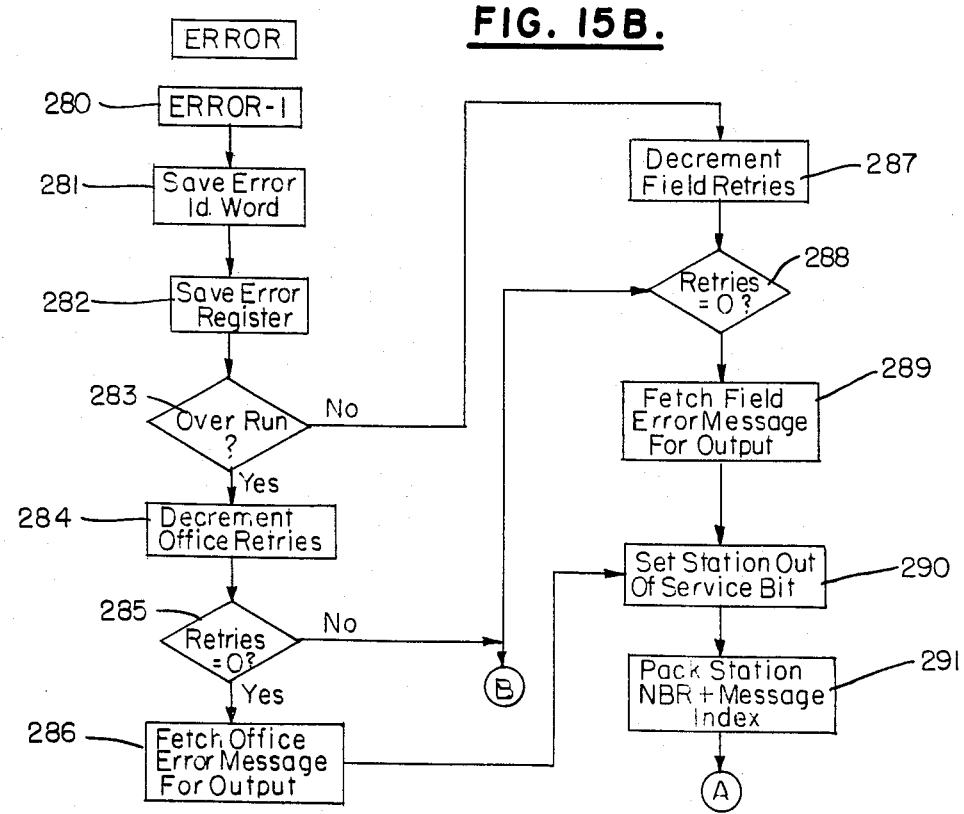
Figure 15C:
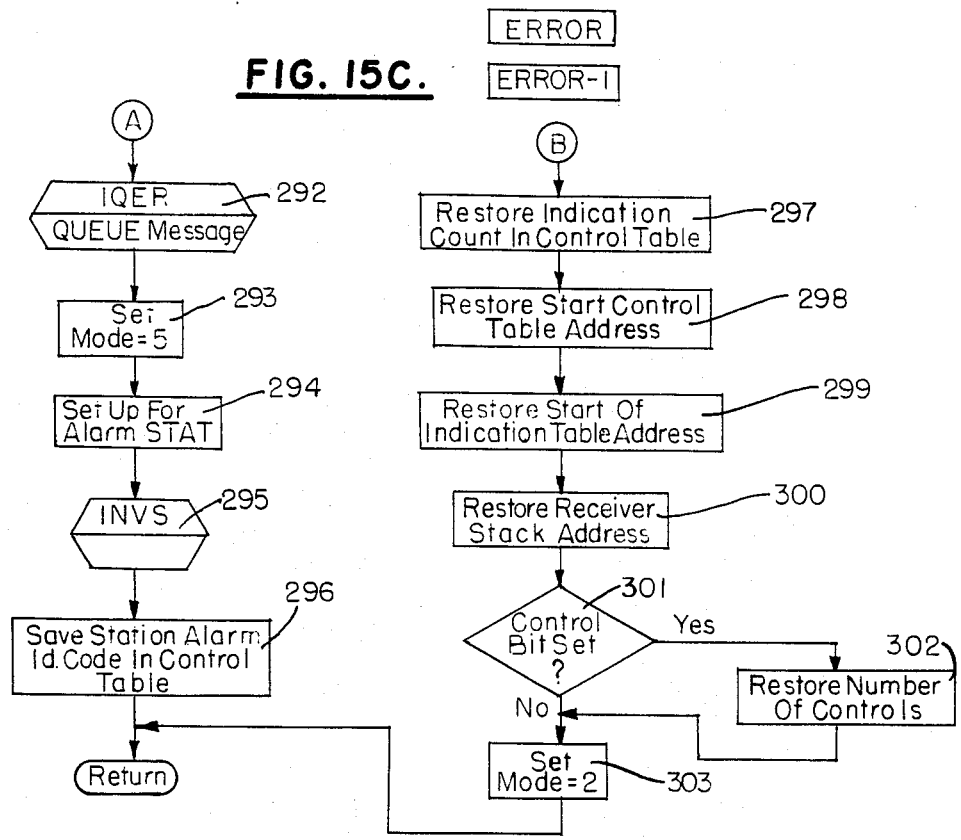
Figure 16:
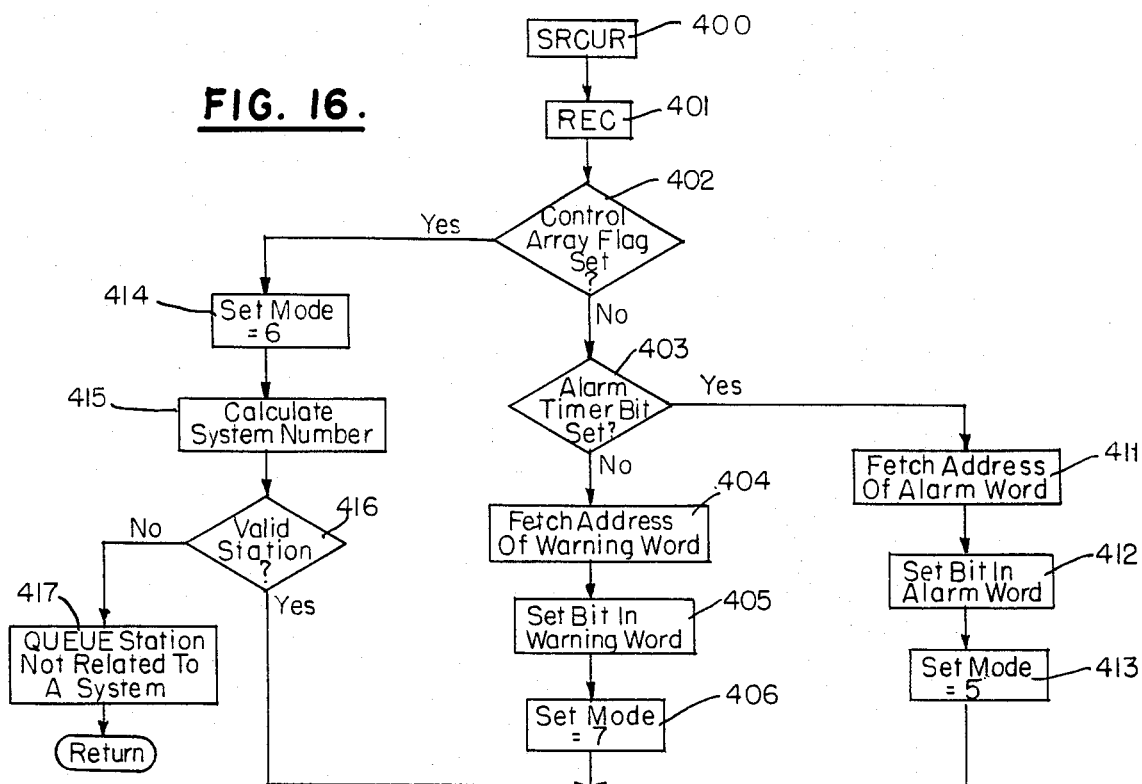
FIG. 16 illustrates the station receiver routine (SRCVR)

If in the course of communicating with any station the modem controller provides an error interrupt, that is an interrupt indicating that the modem controller has detected a communication error the routine illustrated in FIGS. 15A, 15B and 15C will be entered. This routine properly manages the interrupt.

The first function calculates the table addresses for the particular system. Since each system is identified by a different interrupt port, information is readily available as to which system initiated the error interrupt. Function 262 reads the error register (see FIG. 5B in the Dansbach et al application, Ser. No. 516,849, filed Oct. 21, 1974). Function 263 provides storage for the error status and function 264 kills the integrity timer. Since a communication error has been detected there is no point in allowing the integrity timer to time out and thus initiate another error indication. Then decision point 265 determines if this is an invalid interrupt that is, did the error register indicate a lack of an error. If that was the case, functions 276 and 277 are performed for statistical record keeping and a message is queued and that concludes the interrupt routine. However, if the interrupt was not invalid then decision points 266 through 269 determine the type of error. Since a number of errors might have occurred simultaneously, these decision points are traversed serially. Functions 273, 274, 275 and 278 accomplish the statistical record keeping by incrementing the appropriate error counter as well as the total error counter and then the subroutine ERROR 1 is performed. This routine is illustrated in FIGS. 15B and 15C. Function 281 and 282 save previously stored information as to the system which caused the error interrupt and the contents of the error register. Then decision point 283 determines if this is an overrun error. Assuming, that at decision point 283 an overrun error was detected, function 287 would decrement the field retries and decision point 288 would determine if a number of allowable field retries had been exhausted. If not the routine jumps to point B. Likewise, if an overrun error had not been detected function 284 decrements the office retries and decision point 285 determines if the allowable number of office retries have been exhausted. If they have not, the routine jumps to point B.

If the office or field retries have been exhausted, respectively, functions 286 to 289 are performed to fetch either the office error message or field error message. Then functions 290 and 291 are performed to set the station out-of-service bit and tack the station number and message index for transmission. Then the program returns to point A.

If decision point 285 or 288 determines that the number of retries had not been exhausted, functions 297 through 300 are performed. These respectively restore the indication count in a control table, restore the start control table address, restore the start indication table address and restore the receiver stack address. This is all setting the stage for a further attempt at communication with the offending station. The decision point 301 determines if the control bit is set and if it is function 302 restores the number of controls which are to be sent. It will be recalled that if this is necessary for the transmit interrupt routine to know when the proper number of control words have been set. At the conclusion of function 302, or if function 302 is not performed, function 303 sets the mode equal to 2 and the routine returns. With the mode equal to 2 SCNEX, when entered, will again attempt ADXMT to transmit the address to the station.

On the other hand, if the number of retries have been exhausted then continuing at point A. .IQER function 292, would queue the error message. Function 293 would set the mode equal to 5 since the number of retries have been exhausted, this station timer should be checked to see if it has expired. With the mode equal to 5 this function will be performed. Function 294 sets up for alarm status check and function 295 starts an out-of-service timer. Function 296 provides for storing the station alarm ID code in the control table. This identifies the out-of-service timer which may have been set to a period of as long as thirty minutes for this condition. This concludes the error subroutine with the mode set to 5 if the number of retries have been exhausted or set to 2 if they had not. At this point, after decision points 266 through 269 have been completed along with the appropriate running of ERROR 1, if appropriate error had been detected, function 270 sets the receiver stack control word to 4 indicating an error. Function 272 performs a .IXMT which concludes the error subroutine.

Figure 17:
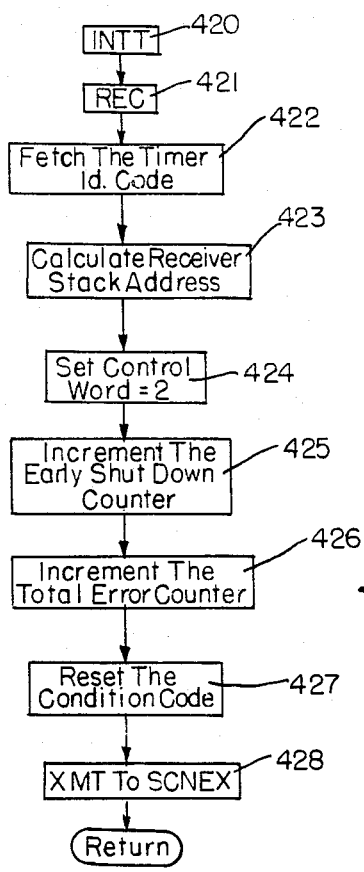
FIG. 17 illustrates the integrity timer routine (INTE)

Referring to FIG. 7A we see that during the performance of ADXMT function 107 starts an integrity timer. Now referring to FIG. 3 we see that one of the clock interrupts refers to the integrity timer expiration or INTT. That routine is called when a station, whose address has been transmitted, fails to respond in the time taken for the integrity timer to expire. This is a station which is in need of communications but with whom communication has not been established. INTT is illustrated in FIG. 17.

This routine derives from the receiver function and the first function 422 is to fetch the timer ID code, to identify the timer which has expired. Function 423 calculates the receiver stack address. The timer ID code identifies the system and from the system the receiver stack address can be determined. Function 424 sets the control word in the receiver stack to 2 indicating an integrity timer expiration. Function 425 increments an early shut down counter function 426 increments the total error counter. These are statistical functions. Function 427 resets the condition code and function 428 XMITs to SCNEX. In this condition, SCNEX will search for an active receiver stack. The receiver stack associated with the station whose timer has expired will obviously be active since function 424 set the control word to 2. However other active receiver stacks may also be located and serviced first.

Figure 4B:
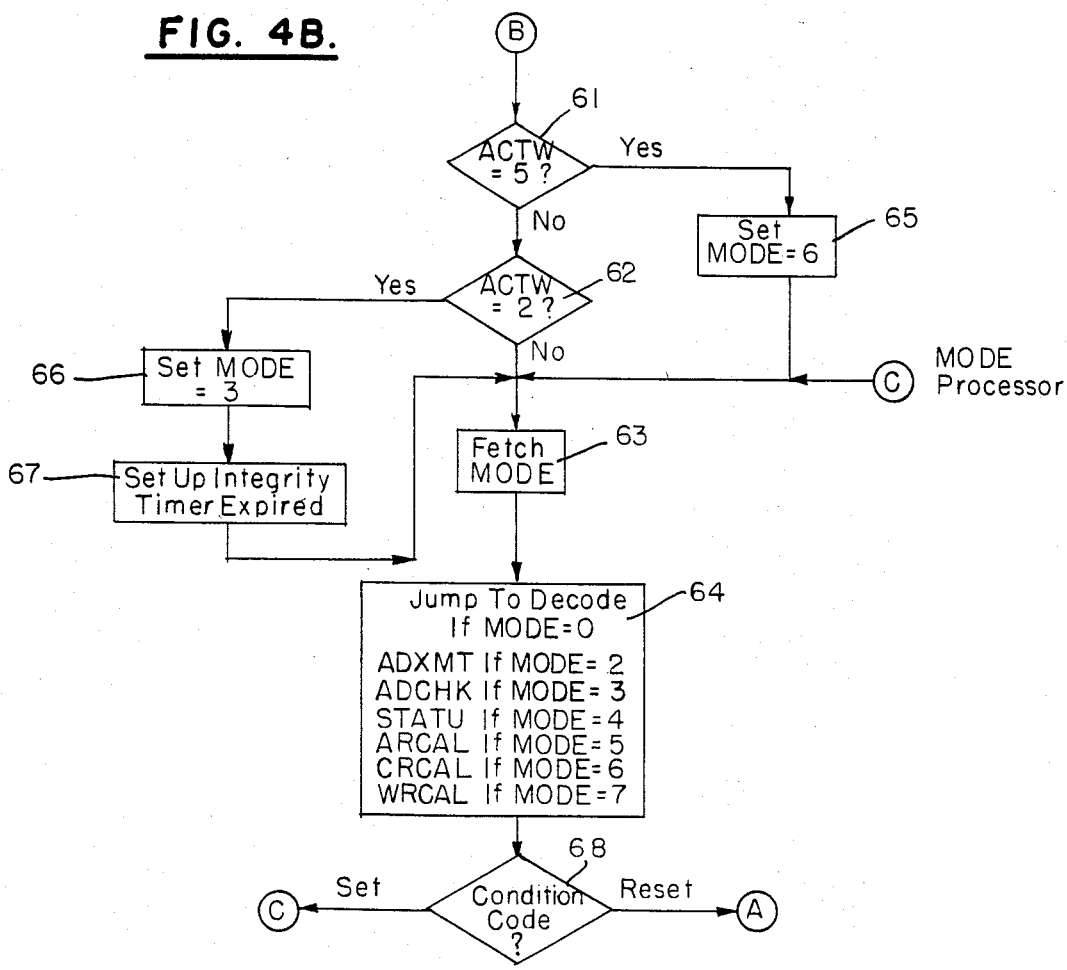

Referring briefly to FIG. 4B we see that if, at decision point 62, the active control word is found to be 2 then function 66 sets the mode to 3 and sets up an indication that an integrity timer has expired. With the mode equal to 3 then reference is made to ADCHK (FIG. 8). Briefly this routine determines whether or not the retries have been exhausted and if not sets up for a further transmission attempt.

Figure 5:
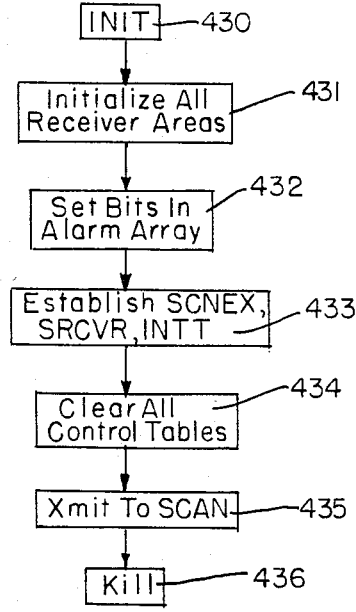
FIG. 5 illustrates the initialization routine INIT)

The last routine to be discussed is the initialization routine (INIT) illustrated in FIG. 5. This routine is provided for the case of system start-up and is a special purpose routine used at only system start-up time. At this time whatever information is contained in the control table must be erased, the information contained in receiver areas, if any must be dispensed with as well as other intermediate and not finalized data. To perform this, function 431 initializes all the receiver areas, setting all bits to zero, function 432 sets bits in the alarm array equal to the number of stations which are active. Part of the initialization routine is to obtain up-to-date information concerning field conditions. To perform this, of course, the indication tables must be cleared and new transmissions received from each and every field station concerning its status. Setting all the bits in the alarm array will effectively perform a roll call in that when ARCAL is called, every bit which is set (and all bits are set), will result in a communication attempt to all stations. Communication attempts must be made in the order in which the bits are tested in the alarm array.

Function 433 establishes the SCNEX, SRCVR and INTT routines and function 434 clears all control tables. Finally, to initiate operation function 435 provides an XMIT to SCNEX and function 436 kills INTT.

From the foregoing description of the apparatus employed and the functions performed, the reader will recognize, in FIGS. 19(a) and 19(b), a functional block diagram of a portion of the system. More specifically, as is illustrated in FIG. 19(a), a monitoring means 450 is illustrated which is responsive to a plurality of first timers, which first timers can be set by a setting means 451 in response to a signal from the XMIT control 455. In addition, the monitoring means 450 is also responsive to a plurality of second timers which can be individually set by a setting means 452. In addition, the monitoring means 450 is further responsive to a plurality of elements in a control request storage array. The monitoring means 450, when it detects expiration of first or second timer or the pendency of a control request, indicated by a distinctive condition of the element in the control request array, provides a signal to the XMIT control 455 to initiate communications with the station corresponding to the expired timer or the location in the control request array which is distinctively conditioned to indicate the existence of a pending control request. Operation of the XMIT control 455 serves to control the XMIT 453, which, as is illustrated in FIG. 19(a), is connected to the modem control (see FIG. 1). Operation of the XMIT control 455 serves to control each of the setting means 451 and 452 to set the expired timer or timers (as well as any unexpired timer associated with the same station) to begin timing out a new period. In addition, the setting means 454 is enabled to set the integrity timer 456. As has been explained above, the integrity timer 456 is controlled by the setting means 454 to time out a period during which communication should be established with the remote station. When communication is properly established, as evidenced by the receiver 457, receiving the station's address, the integrity timer 456 is inhibited. If, during the period of the integrity timer 456, a station's address is not received, the timer 456 will not be inhibited, and its expiration will be detected by the monitoring means 458.

A number of events occur upon expiration of the integrity timer 456, as detected by the monitoring means 458. In the first place, an inhibiting device 459 is actuated to inhibit further transmissions by inhibiting further operation of the XMIT control 455. Furthermore, a retry unit 460 begins a communication cycle again in an attempt to raise the station. Furthermore, a retry counter 451 is incremented. Storage unit 462 stores certain characteristics for each of the different stations. One characteristic is the allowable number of retries in the event that a failure in communications is detected. Thus, the retry counter 461 compares the present number of retry counts with that contained in the storage device 462 with respect to the associated remote station. When the number of retry counts reaches the value stored in the unit 462, the out of service unit 463 responds and makes an appropriate entry in the storage 462 with regard to the associated remote station. Prior to XMIT control 455 initiating transmission to any particular station, the storage unit 462 is interrogated. One item of information that is sought is whether or not the remote station is "out of service". Thus, after an allowable number of retries have been attempted without successful communications, the out of service unit 463 makes the appropriate storage in unit 462. When XMIT control 455 interrogates the storage 462 and determines that the station is "out of service" communications will only be attempted at rather infrequent intervals.

FIG. 19(b) illustrates the block diagram of the monitoring means 450, showing its component parts in more detail. In particular, each of the first timers (FIG. 19(a)), has an associated bi-stable element in an array in the monitoring means. For instance, a first array comprising bi-stable elements 480–483 is associated with the timers in the group of first timers. Likewise, the series of bi-stable elements 490–493 are associated with the second timers. Each of the bi-stable elements can be in one of two conditions, based on the last signal received. The condition of the bi-stable device is manifested by one or two distinctive signals on an output terminal. The outputs of each of the bi-stable devices are provided to a detector 475, whose output is connected to the XMIT control 455 (FIG. 19(a)). Thus, when a particular timer expires, either in the first or second timers, the appropriate bi-stable element (elements 480–483 in the first array, or elements 490–493 in the second array) will be set. Detector 475 responds to that condition to appropriately signal the XMIT control 455. At the same time, detector 475 controls a reset means 485. The reset means has a plurality of outputs equal in number to the number of bi-stable elements in an array. Each different output of the reset means 485 is connected to the resetting inputs on two bi-stable elements, one on each array, associated with a common remote station. Finally, the setting input to each of the bi-stable elements in each of the arrays is connected to a different one of the first or second timers.

Thus, in operation, upon expiration of a timer, the associated bi-stable element would become set. Detector 475 responds to this to provide information to the XMIT control 455 as to the fact that a timer has expired, in addition to the identity of the timer. Furthermore, detector 475 operates the reset means 485 so as to reset both the bi-stable elements associated with that station.

What we claim is:

1. A communication apparatus for communicating between a central office and a plurality of separately addressable remote stations over a single duplex communication link, said apparatus including a transmitter and receiver at said central office and at each of said remote stations, digital computer means for controlling said central office transmitter and responsive to said receiver, said digital computer means including;
   a plurality of first timers, each associated with a different remote station,
   means to set each said first timer to a value related to the maximum desired delay between successive communications with the associated remote station,
   means for monitoring all said first timers for determining that a timer has expired, and
   transmit control means responsive to said monitoring means for operating said transmitter to transmit to a remote station associated with said timer which has expired.

2. The apparatus of claim 1 in which said transmit control means operates said means to set, to set said expired first timer on operation of said transmitter.

3. The apparatus of claim 1 wherein said digital computer means includes;
   a second plurality of timers, each of said second timers also associated with a different remote station,
   second means to set each of said second plurality of timers to a value related to the minimum desired time between successive communications with the associated remote station,
   said monitoring means monitoring all said first and second timers.

4. The apparatus of claim 3 in which said transmit control means operates said first and second means to set both first and second timer associated with the remote station which is transmitted to.

5. The apparatus of claim 4 in which said means for monitoring includes a pair of arrays, each associated with one of said first or second plurality of timers and means to store an appropriate designation in an array associated with an expired timer when an expired timer is detected, said means to store storing said appropriate designation in a location in said array related to the station associated with said expired timer.

6. The apparatus of claim 5 in which said means for monitoring includes means for resetting said designation in both said arrays when said monitoring means detects an appropriate designation stored in either of said arrays.

7. The apparatus of claim 2 which further includes integrity timer means, means to set said integrity timer to a value which is less than the time necessary to transmit a control message,
   said means to set operating in response to the operation of said transmit control means in transmitting to a remote station,
   integrity timer monitoring means operated distinctively in response to expiration of said integrity timer,
   and transmit inhibit means operated in response to operation of said integrity monitoring means for inhibiting the completion of transmission of a control message by said master station.

8. The apparatus of claim 7 which further includes retry control means operated in response to operation of said transmit inhibit means for initiating a further communication attempt with said remote station being transmitted to.

9. The apparatus of claim 8 which includes counting means allowing only a predetermined number of retries,
   and station condition storage means responsive to said retry counter counting said predetermined number of retries for thereafter designating said remote station as out-of-service.

10. The apparatus of claim 1 in which said digital computer means includes station storage means for separately storing the characteristics of each of said remote stations,
    said transmit control means including transmitter inhibit means operated by said transmitter controls to interrogate said storage means for inhibiting the operation of said transmit control means if said storage means indicates that said station is in an abnormal condition.

11. The apparatus of claim 10 in which said transmit control means includes means to detect communication failures,
    means to initiate a predetermined number of communication retry attempts when a communication failure is detected,
    and means to store in said station storage means information indicitive of the abnormal state of said station if said predetermined number of retry attempts is executed without achieving successful communications.

12. The apparatus of claim 1 in which said digital computer means further includes a control request storage array to store control requests, said control request storage array storing control requests in a unique location for each of said remote stations, said means for monitoring also monitoring said control request storage array, said transmit control means responsive to said means for monitoring for operating said transmitter to transmit to a remote station associated with the pending control request stored in said control request storage array.

* * * * *